US012178366B2

(12) United States Patent
Manchiraju

(10) Patent No.: US 12,178,366 B2
(45) **Date of Patent: *Dec. 31, 2024**

(54) WALK IN BATH

(71) Applicant: Kohler Co., Kohler, WI (US)

(72) Inventor: Ravikanth Manchiraju, Peoria, IL (US)

(73) Assignee: KOHLER CO., Kohler, WI (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/075,239

(22) Filed: Oct. 20, 2020

(65) Prior Publication Data

US 2021/0030214 A1 Feb. 4, 2021

Related U.S. Application Data

(62) Division of application No. 15/404,534, filed on Jan. 12, 2017, now Pat. No. 10,881,251.

(51) Int. Cl.
*A47K 3/00* (2006.01)
*A47K 3/022* (2006.01)
*A61H 33/00* (2006.01)

(52) U.S. Cl.
CPC .............. *A47K 3/006* (2013.01); *A47K 3/003* (2013.01); *A47K 3/022* (2013.01);
(Continued)

(58) Field of Classification Search
CPC ......... A47K 3/006; A47K 3/003; A47K 3/022; A47K 3/02; A61H 33/0087; A61H 33/6005; A61H 2201/0207
(Continued)

(56) References Cited

U.S. PATENT DOCUMENTS

| | | | |
|---|---|---|---|
| 77,480 | A | 5/1868 | Gourlay |
| 228,722 | A | 6/1880 | Arnd |

(Continued)

FOREIGN PATENT DOCUMENTS

| | | | |
|---|---|---|---|
| CN | 2730291 | Y | 10/2005 |
| CN | 2834396 | Y | 11/2006 |

(Continued)

OTHER PUBLICATIONS

English translation of SE 437759B printed Nov. 14, 22 (Year: 1985).*

(Continued)

*Primary Examiner* — Christine J Skubinna
(74) *Attorney, Agent, or Firm* — FOLEY & LARDNER LLP

(57) ABSTRACT

A walk in bath includes a shell, a door, and a seal member. The shell defines a bathing area and includes a wall with an opening therein. The door is moveable relative to the wall between a closed position, in which the door engages the opening, and an open position allowing ingress into and egress from the bathing area through the opening. The seal member is located between the wall and the door in the closed position to seal a gap therebetween to prohibit water from leaking from the bathing area through the gap. The seal member includes a first end, a second end, and an intermediate hollow section extending between the first and second ends. Each of the first and second ends is closed to prevent water from entering into the seal member.

21 Claims, 12 Drawing Sheets

(52) U.S. Cl.
CPC ..... *A61H 33/0087* (2013.01); *A61H 33/6005* (2013.01); *A61H 2201/0207* (2013.01)

(58) Field of Classification Search
USPC .......................................................... 4/541.1
See application file for complete search history.

(56) References Cited

U.S. PATENT DOCUMENTS

| | | | | |
|---|---|---|---|---|
| 746,389 | A | | 12/1903 | Schmidt |
| 746,390 | A | | 12/1903 | Schmidt |
| 2,075,933 | A | | 7/1936 | Friedlander |
| 2,068,457 | A | | 1/1937 | Kirkwood |
| D143,766 | S | | 8/1945 | Stanitz |
| 2,456,275 | A | | 2/1946 | Harris |
| 2,569,825 | A | | 10/1951 | Otis |
| 2,570,053 | A | | 10/1951 | Fowler |
| 2,714,725 | A | | 8/1955 | Boone |
| 2,804,629 | A | | 9/1957 | Ring |
| 2,977,604 | A | | 4/1961 | Miller |
| 2,991,482 | A | | 7/1961 | Brass |
| 3,015,110 | A | | 1/1962 | Treand |
| 3,066,316 | A | | 12/1962 | Russell |
| 3,371,354 | A | | 3/1968 | Hayslett |
| 3,380,078 | A | | 4/1968 | Hanson |
| 3,416,166 | A | | 12/1968 | Hanson |
| 3,423,769 | A | | 1/1969 | Cowley |
| 3,604,018 | A | | 9/1971 | Moran |
| 3,663,971 | A | | 5/1972 | Bonhote |
| D225,225 | S | | 11/1972 | Russel |
| 3,703,733 | A | | 11/1972 | McLoughlin |
| 3,719,960 | A | | 3/1973 | Russell |
| 3,863,273 | A | | 2/1975 | Averill |
| 3,864,762 | A | | 2/1975 | Finch et al. |
| 3,990,183 | A | | 11/1976 | Meggs et al. |
| 4,089,135 | A | | 5/1978 | Beny et al. |
| D248,107 | S | | 6/1978 | Brendgord et al. |
| 4,099,272 | A | | 7/1978 | Sowder |
| 4,112,524 | A | | 9/1978 | Johansson |
| 4,112,525 | A | | 9/1978 | Roberts |
| 4,118,810 | A | | 10/1978 | Brickhouse |
| 4,166,297 | A | | 9/1979 | Saleeby |
| 4,202,060 | A | | 5/1980 | Touze |
| 4,296,508 | A | | 10/1981 | Moran |
| D261,796 | S | | 11/1981 | Queen |
| 4,337,540 | A | | 7/1982 | Lindeman |
| 4,346,485 | A | | 8/1982 | Reed et al. |
| 4,360,935 | A | | 11/1982 | Barrett, Sr. |
| 4,365,367 | A | | 12/1982 | Houle et al. |
| 4,375,736 | A | | 3/1983 | Teckchandani |
| 4,388,778 | A | | 6/1983 | Brooke |
| 4,399,569 | A | | 8/1983 | Houle |
| D271,523 | S | | 11/1983 | Richburg |
| 4,432,104 | A | | 2/1984 | Sasaki |
| 4,439,877 | A | | 4/1984 | Houle |
| 4,446,586 | A | | 5/1984 | Reed et al. |
| 4,523,341 | A | | 6/1985 | Queen |
| 4,535,489 | A | | 8/1985 | Elkins |
| 4,542,545 | A | | 9/1985 | Johnson et al. |
| 4,546,506 | A | | 10/1985 | Houle et al. |
| 4,561,160 | A | | 12/1985 | Nicol et al. |
| 4,583,251 | A | | 4/1986 | Furst et al. |
| D285,346 | S | | 8/1986 | Sween |
| 4,672,693 | A | | 6/1987 | Schenstrom |
| 4,680,817 | A | | 7/1987 | Sloan et al. |
| D297,161 | S | | 8/1988 | Weschta |
| 4,796,312 | A | | 1/1989 | Corlew |
| 4,802,247 | A | | 2/1989 | Leichle et al. |
| 4,817,219 | A | | 4/1989 | Schenstrom |
| D303,329 | S | | 9/1989 | Ebert |
| 4,890,341 | A | | 1/1990 | Forbes |
| 4,916,764 | A | | 4/1990 | Meaden et al. |
| 4,928,329 | A | | 5/1990 | Palmeri |
| 4,953,241 | A | | 9/1990 | Williams |
| 4,953,261 | A | | 9/1990 | Lyons |
| 4,993,087 | A | | 2/1991 | Roquebrune |
| 4,998,946 | A | * | 3/1991 | Nozaki .................... B60J 10/24 49/498.1 |
| D319,491 | S | | 8/1991 | Barnes et al. |
| 5,056,169 | A | | 10/1991 | Roguebrune |
| D326,508 | S | | 5/1992 | Sauter et al. |
| 5,123,129 | A | | 6/1992 | Lyons |
| 5,163,187 | A | | 11/1992 | Dannenberg et al. |
| D332,827 | S | | 1/1993 | Dannenberg et al. |
| 5,184,358 | A | | 2/1993 | Gruidel et al. |
| 5,220,696 | A | | 6/1993 | Dannenberg et al. |
| D338,059 | S | | 8/1993 | Richards |
| 5,255,400 | A | | 10/1993 | Sween |
| 5,312,179 | A | | 5/1994 | Schlaud et al. |
| 5,333,664 | A | | 8/1994 | Sirianni et al. |
| 5,341,524 | A | | 8/1994 | Zellner |
| 5,351,345 | A | | 10/1994 | Sills et al. |
| D352,099 | S | | 11/1994 | Andersen |
| D355,245 | S | | 2/1995 | Sills et al. |
| 5,446,929 | A | | 9/1995 | Sills et al. |
| 5,463,780 | A | | 11/1995 | Harris et al. |
| 5,548,855 | A | | 8/1996 | Jackson |
| 5,549,149 | A | | 8/1996 | Sills et al. |
| 5,628,851 | A | | 5/1997 | Lawler |
| 5,647,071 | A | | 7/1997 | Suzuki et al. |
| 5,690,157 | A | | 11/1997 | Chen |
| 5,701,614 | A | | 12/1997 | Appleford et al. |
| 5,722,099 | A | | 3/1998 | Suzuki et al. |
| 5,778,463 | A | | 7/1998 | Teckchandani et al. |
| 5,813,062 | A | | 9/1998 | Vago et al. |
| 5,940,902 | A | | 8/1999 | Onge et al. |
| 5,978,983 | A | | 11/1999 | Queen et al. |
| 6,023,794 | A | | 2/2000 | Nein |
| 6,061,846 | A | | 5/2000 | Peterson |
| 6,076,204 | A | | 6/2000 | Mullick |
| 6,101,642 | A | | 8/2000 | Auten et al. |
| 6,145,140 | A | | 11/2000 | Fernie |
| 6,151,727 | A | | 11/2000 | Lofquist, Jr. |
| 6,212,704 | B1 | | 4/2001 | Peterson |
| 6,226,808 | B1 | | 5/2001 | Walshe |
| 6,241,295 | B1 | | 6/2001 | Hoogendoorn |
| 6,272,698 | B1 | | 8/2001 | Stafford |
| 6,334,225 | B1 | | 1/2002 | Brinkmann |
| 6,381,769 | B1 | | 5/2002 | Lofquist, Jr. |
| 6,473,915 | B1 | | 11/2002 | Davis et al. |
| 6,516,477 | B1 | | 2/2003 | Storm |
| 6,662,385 | B1 | | 12/2003 | Bayne |
| 6,694,542 | B2 | | 2/2004 | Johansson |
| 6,735,792 | B2 | | 5/2004 | Johansson |
| 6,766,543 | B1 | | 7/2004 | Hollis et al. |
| 6,802,088 | B1 | | 10/2004 | Gruner |
| D511,567 | S | | 11/2005 | Beahn |
| 7,107,630 | B2 | | 9/2006 | Noro et al. |
| 7,111,335 | B2 | | 9/2006 | Noro et al. |
| 7,237,276 | B2 | | 7/2007 | Longman |
| 7,299,509 | B1 | | 11/2007 | Neidich |
| 7,310,837 | B2 | | 12/2007 | Reynolds et al. |
| D573,700 | S | | 7/2008 | Clarke |
| D601,401 | S | | 10/2009 | Neidich |
| D610,658 | S | | 2/2010 | Torres |
| D611,578 | S | | 3/2010 | Torres |
| D613,835 | S | | 4/2010 | Hoh et al. |
| 7,690,701 | B2 | | 4/2010 | Van Ravenhorst |
| D622,363 | S | | 8/2010 | Zierler |
| 7,788,783 | B2 | | 9/2010 | Neidich |
| 7,823,229 | B2 | | 11/2010 | O'Brien et al. |
| 7,926,126 | B2 | | 4/2011 | Whitley |
| 7,942,465 | B1 | | 5/2011 | Jefferson |
| 8,082,609 | B2 | | 12/2011 | Rydalch |
| 8,230,534 | B2 | | 7/2012 | Torres et al. |
| 8,239,979 | B2 | | 8/2012 | Seymour et al. |
| 8,307,471 | B2 | | 11/2012 | Seymour et al. |
| 8,375,478 | B2 | | 2/2013 | Luo |
| 8,443,470 | B2 | | 5/2013 | Webb |
| 8,448,269 | B2 | | 5/2013 | Libit et al. |
| D686,332 | S | | 7/2013 | Suri |
| 8,505,128 | B2 | | 8/2013 | Staudinger |
| 8,549,678 | B2 | | 10/2013 | Neidich et al. |
| D697,183 | S | | 1/2014 | Sital et al. |
| D697,593 | S | | 1/2014 | Sills |

(56) References Cited

U.S. PATENT DOCUMENTS

| | | | | |
|---|---|---|---|---|
| 8,683,622 | B2 | 4/2014 | Ciechanowski et al. | |
| 9,326,326 | B2 * | 4/2016 | Brunelle | H05B 3/34 |
| 2002/0124305 | A1 | 9/2002 | Johansson | |
| 2003/0056447 | A1 | 3/2003 | O'Brien et al. | |
| 2003/0084504 | A1 | 5/2003 | Johansson | |
| 2003/0121095 | A1 | 7/2003 | Argento et al. | |
| 2003/0131407 | A1 | 7/2003 | Gutierrez et al. | |
| 2003/0159209 | A1 | 8/2003 | Bentley | |
| 2003/0159210 | A1 | 8/2003 | Bentley | |
| 2004/0034917 | A1 | 2/2004 | Noro et al. | |
| 2004/0051365 | A1 | 3/2004 | Darst et al. | |
| 2004/0064883 | A1 | 4/2004 | Appleford et al. | |
| 2004/0078887 | A1 | 4/2004 | Kuntz | |
| 2004/0078888 | A1 | 4/2004 | Noro et al. | |
| 2004/0139542 | A1 | 7/2004 | Crane | |
| 2004/0163609 | A1 | 8/2004 | Jeffery | |
| 2004/0237184 | A1 | 12/2004 | Longman | |
| 2005/0000024 | A1 | 1/2005 | Jakubowski | |
| 2005/0028268 | A1 | 2/2005 | Hess | |
| 2005/0039252 | A1 | 2/2005 | Fainberg | |
| 2005/0044620 | A1 | 3/2005 | Metcalf | |
| 2005/0066436 | A1 | 3/2005 | Mazar | |
| 2005/0076431 | A1 | 4/2005 | Reynolds et al. | |
| 2005/0102746 | A1 | 5/2005 | Wright et al. | |
| 2005/0138724 | A1 | 6/2005 | Owen | |
| 2005/0160526 | A1 | 7/2005 | Korn | |
| 2005/0217017 | A1 | 10/2005 | Moser | |
| 2006/0075548 | A1 | 4/2006 | Kranson et al. | |
| 2006/0207011 | A1 | 9/2006 | Meyers et al. | |
| 2006/0272085 | A1 | 12/2006 | Hribsek | |
| 2007/0011803 | A1 | 1/2007 | Ogrodnick | |
| 2007/0022529 | A1 | 2/2007 | Thorne et al. | |
| 2007/0044231 | A1 | 3/2007 | Ball | |
| 2007/0067901 | A1 | 3/2007 | Longman | |
| 2007/0107120 | A1 | 5/2007 | Ingraham | |
| 2007/0130688 | A1 | 6/2007 | Thorne et al. | |
| 2007/0235454 | A1 | 10/2007 | Woodruff | |
| 2008/0004677 | A1 | 1/2008 | Gay | |
| 2008/0022448 | A1 | 1/2008 | Todd et al. | |
| 2008/0083063 | A1 | 4/2008 | Libit et al. | |
| 2008/0092361 | A1 | 4/2008 | Neidich | |
| 2008/0098510 | A1 | 5/2008 | O'Brien et al. | |
| 2008/0109954 | A1 | 5/2008 | Neidich | |
| 2008/0111383 | A1 | 5/2008 | Van Ravenhorst | |
| 2008/0134428 | A1 | 6/2008 | Call | |
| 2008/0178380 | A1 | 7/2008 | Rydalch | |
| 2008/0189847 | A1 | 8/2008 | Yamasaki et al. | |
| 2008/0216228 | A1 | 9/2008 | Bonanno | |
| 2008/0222787 | A1 | 9/2008 | Staudinger | |
| 2008/0222790 | A1 | 9/2008 | Grant | |
| 2008/0265548 | A1 | 10/2008 | Hammer et al. | |
| 2008/0301868 | A1 | 12/2008 | Libit et al. | |
| 2009/0013460 | A1 | 1/2009 | Whitley | |
| 2009/0025136 | A1 | 1/2009 | Cheng | |
| 2009/0139021 | A1 | 6/2009 | Cheng | |
| 2009/0211615 | A1 | 8/2009 | Ho | |
| 2009/0288248 | A1 | 11/2009 | Longman | |
| 2010/0037382 | A1 | 2/2010 | Spiker et al. | |
| 2010/0038934 | A1 | 2/2010 | Bennett et al. | |
| 2010/0052920 | A1 | 3/2010 | Roach | |
| 2010/0088816 | A1 | 4/2010 | Rollins | |
| 2010/0101012 | A1 | 4/2010 | Sampson | |
| 2010/0156120 | A1 | 6/2010 | Luo | |
| 2010/0192293 | A1 | 8/2010 | Sauers et al. | |
| 2010/0212083 | A1 | 8/2010 | Stafford | |
| 2010/0236041 | A1 | 9/2010 | Stafford | |
| 2010/0251476 | A1 | 10/2010 | Bates et al. | |
| 2010/0263119 | A1 | 10/2010 | Neidich et al. | |
| 2010/0275364 | A1 | 11/2010 | Torres et al. | |
| 2010/0275365 | A1 | 11/2010 | Fainberg | |
| 2010/0325789 | A1 | 12/2010 | Ouyoung | |
| 2011/0017147 | A1 | 1/2011 | Petruzzi | |
| 2011/0035871 | A1 | 2/2011 | Seymour et al. | |
| 2011/0084853 | A1 | 4/2011 | Johnson | |
| 2011/0088159 | A1 | 4/2011 | Knapp et al. | |
| 2011/0099787 | A1 | 5/2011 | Stafford | |
| 2011/0131720 | A1 | 6/2011 | Dean | |
| 2011/0167554 | A1 | 7/2011 | Sato et al. | |
| 2011/0167555 | A1 | 7/2011 | Zierler et al. | |
| 2011/0308005 | A1 | 12/2011 | Smith | |
| 2012/0005820 | A1 | 1/2012 | Stafford | |
| 2012/0030870 | A1 | 2/2012 | Storm | |
| 2012/0030871 | A1 | 2/2012 | Eriksson | |
| 2012/0096638 | A1 | 4/2012 | Webb | |
| 2012/0192349 | A1 | 8/2012 | Torres et al. | |
| 2012/0192350 | A1 * | 8/2012 | Stafford | A47K 3/006 4/556 |
| 2012/0198611 | A1 | 8/2012 | Zierler | |
| 2012/0216343 | A1 | 8/2012 | Stafford et al. | |
| 2012/0284992 | A1 | 11/2012 | Stafford | |
| 2012/0304376 | A1 | 12/2012 | Neidich et al. | |
| 2012/0311778 | A1 | 12/2012 | Dixon | |
| 2013/0025044 | A1 | 1/2013 | Moyer | |
| 2013/0067655 | A1 | 3/2013 | Bennett et al. | |
| 2013/0086738 | A1 | 4/2013 | Millerd | |
| 2013/0086739 | A1 | 4/2013 | Booth, III | |
| 2013/0145542 | A1 | 6/2013 | Luo | |
| 2013/0219609 | A1 | 8/2013 | Libit | |
| 2013/0263371 | A1 | 10/2013 | Qian | |
| 2013/0263967 | A1 | 10/2013 | Woodruff | |
| 2014/0075665 | A1 * | 3/2014 | Sital | A47K 3/006 4/556 |
| 2015/0190665 | A1 * | 7/2015 | Drozdowski | E04H 4/14 4/496 |
| 2016/0000272 | A1 * | 1/2016 | Jin | A47K 3/006 4/555 |

FOREIGN PATENT DOCUMENTS

| | | | | | |
|---|---|---|---|---|---|
| CN | 200963096 | | | 10/2007 | |
| CN | 200980615 | Y | | 11/2007 | |
| CN | 201005578 | Y | | 1/2008 | |
| CN | 201042396 | | | 4/2008 | |
| CN | 201052108 | Y | | 4/2008 | |
| CN | 201179018 | Y | | 1/2009 | |
| CN | 201182545 | Y | | 1/2009 | |
| CN | 201360982 | Y | | 12/2009 | |
| CN | 201426676 | Y | | 3/2010 | |
| CN | 201469111 | U | | 5/2010 | |
| CN | 101803886 | A | | 8/2010 | |
| CN | 201551224 | U | | 8/2010 | |
| CN | 201578134 | U | | 9/2010 | |
| CN | 201679341 | U | | 12/2010 | |
| CN | 201734615 | | | 2/2011 | |
| CN | 201987409 | U | | 9/2011 | |
| CN | 202047684 | U | | 11/2011 | |
| CN | 202117447 | U | | 1/2012 | |
| CN | 202280319 | U | | 6/2012 | |
| CN | 203789797 | U | | 8/2014 | |
| CN | 105395111 | A | | 3/2016 | |
| CN | 106667321 | A | | 5/2017 | |
| CN | 206554739 | U | | 10/2017 | |
| CN | 206792332 | U | | 12/2017 | |
| CN | 207323400 | U | | 5/2018 | |
| CN | 109124427 | A | | 1/2019 | |
| CN | 208388502 | U | | 1/2019 | |
| CN | 109330432 | A | | 2/2019 | |
| CN | 209252599 | U | | 8/2019 | |
| CN | 209463882 | U | | 10/2019 | |
| CN | 209474475 | U | | 10/2019 | |
| CN | 210077495 | U | | 2/2020 | |
| CN | 211155451 | U | | 8/2020 | |
| JP | H08-182631 | A | | 7/1996 | |
| SE | 437759 | B | * | 3/1985 | A47K 3/006 |

OTHER PUBLICATIONS

Chinese Office Action for Chinese Patent Application No. 201810019108.3 dated Sep. 25, 2020.

(56) References Cited

OTHER PUBLICATIONS

English summary of Chinese Office Action, App. No. 201810019108.3, Kohler Co. (Feb. 3, 2020).

* cited by examiner

WALK IN BATH

CROSS-REFERENCE TO RELATED APPLICATION

The present application is a Divisional of U.S. patent application Ser. No. 15/404,534, filed Jan. 12, 2017, which is incorporated herein by reference in its entirety.

BACKGROUND

The present application relates generally to the field of baths. More specifically, this application relates to walk in baths that include a moveable door to allowing improved ingress into and egress from the bath.

SUMMARY

At least one embodiment of the application relates to a walk in bath that includes a shell, a door, and a seal member. The shell defines a bathing area and includes a wall with an opening therein. The door is moveable relative to the wall between a closed position, in which the door engages the opening, and an open position allowing ingress into and egress from the bathing area through the opening. The seal member is located between the wall and the door in the closed position to seal a gap therebetween to prohibit water from leaking from the bathing area through the gap. The seal member includes a first end, a second end, and an intermediate hollow section extending between the first and second ends. Each of the first and second ends is closed to prevent water from entering into the seal member.

The seal member may extend in a non-interrupted manner along an underside, a hinge side, and/or a handle side of the door. The seal member may be directly coupled to the door and may be generally U-shaped. Each of the first and second ends of the seal member may include a finger that engages an opening in the door to couple the associated end of the seal member directly to the door.

The door may be hollow and may include a weep hole for venting.

The walk in bath may include a handle that is coupled to the wall and rotatable relative to the shell and the door between a non-locking position, in which the door is free to move relative to the shell and the handle between the open and closed positions, and a locking position, in which a portion of the handle engages a portion of the door to retain the door in the closed position. The handle may include a pivot member, which defines an axis about which the handle rotates, and a projection, which may be offset from the pivot member and extends away from a base surface. The base surface may be adjacent to the wall and the door, and the projection may be the portion of the handle that engages the portion of the door. The handle may include a composite material that includes an external aesthetic material over an inner structural material.

A wave washer may be located between the handle and the shell, where the wave washer surrounds the pivot member and biases the handle away from the shell.

The portion of the projection that contacts the portion of the door in the locking position may be shaped to remove clearance between the handle and the door in moving the handle from the non-locking position toward the locking position. The shape of the portion of the projection maybe one of a ramped shape, a semi-spherical shape, and a cam shape. The projection may include a compliant material.

At least one embodiment of the application relates to a walk in bath that includes a shell and a door. The shell defines a bathing area, the shell comprising a floor, a front side wall having an opening therein, a rear side wall, a left side wall, a right side wall, a seat, and a deck at the top of each side wall. The seat is below the deck and above the floor and the seat extends from one of the left side or right side walls. The seat includes a seating surface, which supports a user and slopes downwardly moving from a front of the seat toward a rear of the seat proximate the associated left side/right side wall, and a drainage channel having a side portion extending between the seating surface and the associated left side wall or right side wall, a front portion extending between the front side wall and the seating surface, and a rear portion extending between the rear side wall and the seating surface. The drainage channel is lower than the seating surface to channel water; and the door is moveable relative to the shell between a closed position, in which the door engages the opening in the front side wall, and an open position allowing ingress into and egress from the bathing area through the opening.

Each of the front and rear portions of the drainage channel may slope downwardly moving away from the side portion of the drainage channel.

A heating element may be provided to selectively heat a wall, such as the left side wall and/or right side wall that is associated with the seat independently of water in the bath. The heating element may heat a head and neck portion of the deck that is adjacent to the left side wall or right side wall that is associated with the seat.

The walk in bath may include a frame supporting the shell and/or other components of the bath. The frame may include a seat supporting member that supports an underside of the seat, and the seat supporting member may include one or more interconnected members.

The walk in bath may include a plurality of water jets positioned in the left side wall or right side wall that is associated with the seat, so that the plurality of water jets are above the seat and below the deck.

The walk in bath may include a controller located proximate at least one of the deck or the rear side wall for controlling operation of the plurality of water jets and/or at least one of a temperature or a location of the heating element.

At least one embodiment of the application relates to a walk in bath that includes a shell, a door, a hand bar, and a hand rail. The shell may define a bathing area and may include a floor, a front side wall having an opening therein, a rear side wall, a left side wall, and a right side wall. The door is moveable relative to the shell between a closed position, in which the door engages the opening in the front side wall, and an open position allowing ingress into and egress from the bathing area through the opening. The hand bar extends into the bathing area from the rear side wall of the shell opposite the door; and the hand rail is integrated into a front facing side of the front side wall. The hand rail includes a lip and a channel located beneath the lip. The hand bar and the hand rail may be spaced apart by a user distance. For example, the user distance may be no more than four feet.

The shell may include a deck located above and coupled to each side wall, where the deck and an upper portion of the front side wall define the lip, and the channel extends into the front side wall from the front facing surface toward a rear facing surface.

The hand bar may be located adjacent to a handle side of the door in the open position. A portion of the channel of the hand rail may be located adjacent to the door in the closed position.

The floor may include a drain for draining water from the bathing area, so that a height of a step of the front side wall, which is located below the door in the closed position, may be no more than 3 inches.

The front side wall may include one or more access panels that are selectively removable from a base panel to provide access to one or more spaces housing components.

DETAILED DESCRIPTION

Referring generally to the FIGURES, disclosed in this application are walk in baths that include a door that is moveable to advantageously improve the ingress into and egress from the bathing area of the bath. Walk in baths make the process of bathing easier and safer, in particular, for elderly and disabled persons. By providing a door that opens and closes, a person does not have to climb over a side of the tub, which can be challenging and unsafe for elderly and disabled individuals, but rather the person is able to enter and exit through the door opening. The baths described in this application include a wide door and a low step to improve entry/exit. Although the door improves safety and ease of entry/exiting, the door also presents some potential problems. One such problem is maintaining an effective water-tight seal between the door and the shell of the bath to prohibit leaking of water during use of the bath. Another such problem is durability of the door, a door handle if provided, and a door hinge if provided, since these elements may be subjected to increase loading, as elderly/disabled persons may rely on them to carry or withstand more load in supporting the person while entering/exiting the bath. Additional handles in the bath, such as for supporting a user of the bath, also face similar potential problems. It will be apparent to one of ordinary skill in the art that this application discloses walk in baths that overcome these potential problems and others.

Figure 1:
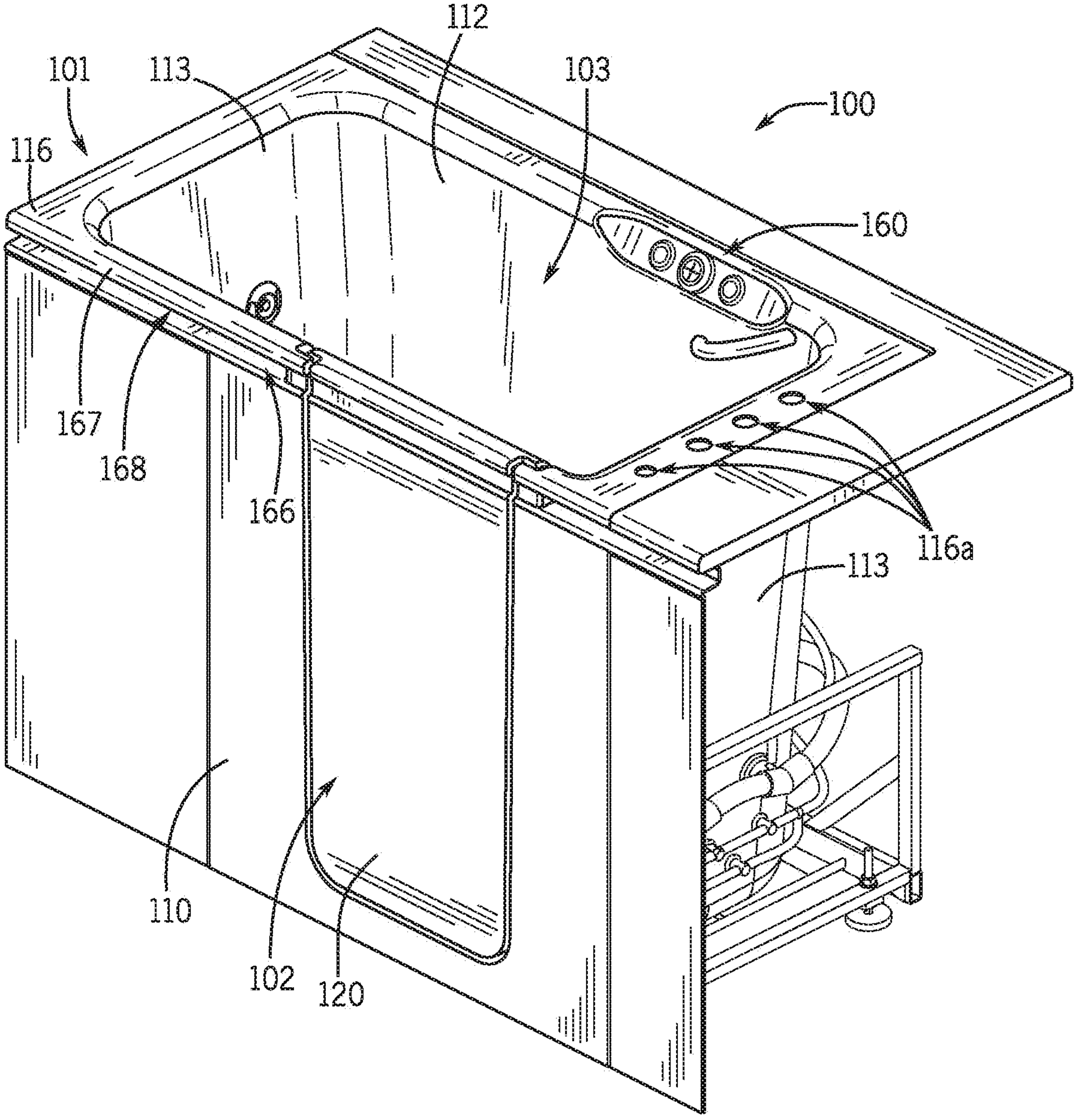
FIG. 1 is a front perspective view of a walk in bath according to at least one embodiment of this application.
Figure 2:
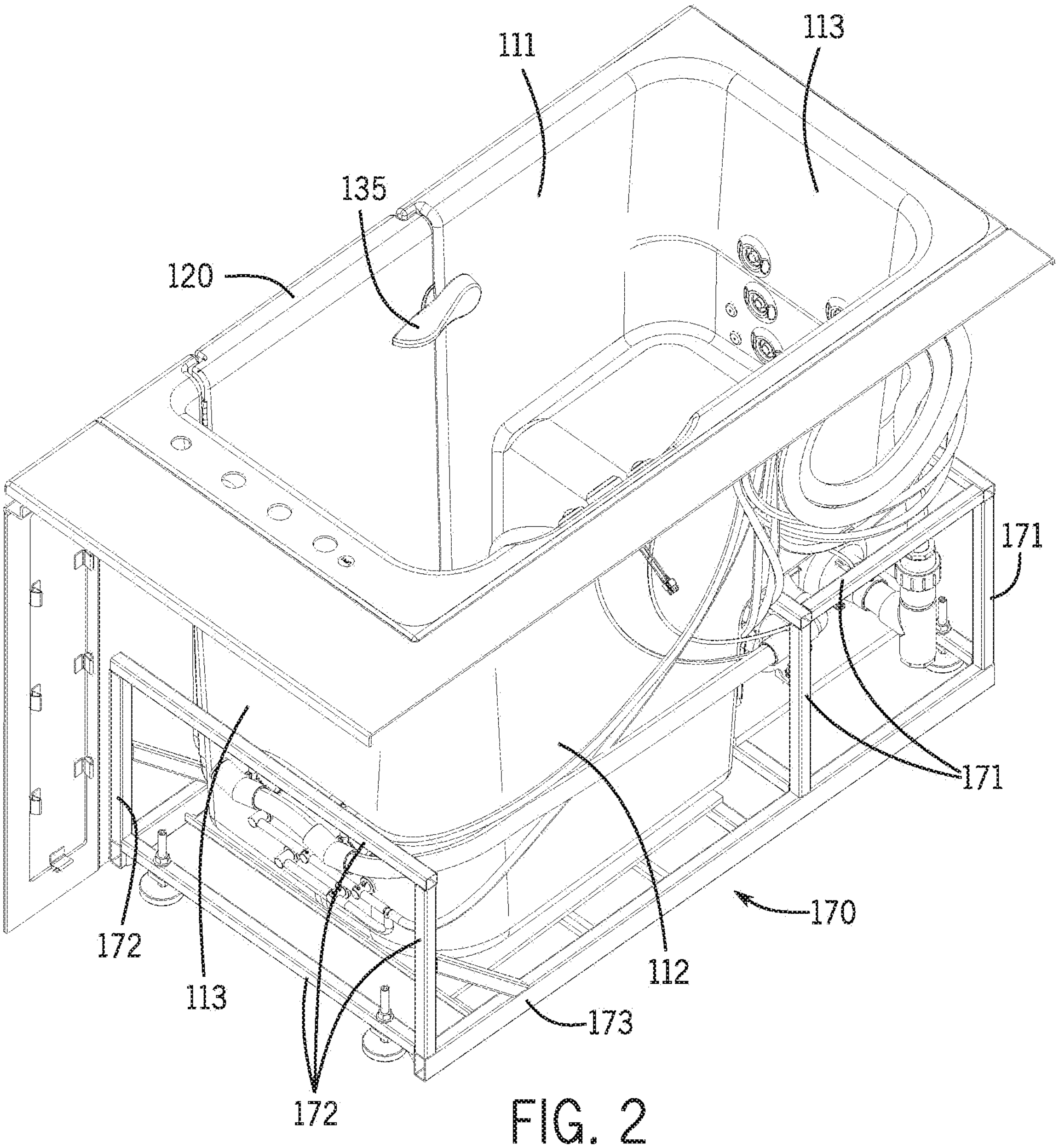
FIG. 2 is a rear perspective view of the walk in bath shown in FIG. 1.

FIGS. 1-19 illustrate at least one embodiment of a walk in bath 100 that is configured to facilitate bathing therein. As shown in FIG. 1, the bath 100 includes a shell 101 and a door assembly 102 having a door 120. The shell 101 is configured to define a bathing area 103 as well as provide elegant aesthetics to the bath. The door assembly 102 includes a door 120 that is rotatable relative to the shell 101 between a closed position, which seals the bathing area 103 for holding water therein, and a full open position, which allows a maximum amount of ingress/egress for a user of the bath 100.

The shell 101 includes one or more walls/panels that define the bathing area 103, either alone or in part with another element (e.g., door), as well as the exterior aesthetics. For example, the shell may include a floor, a front side wall, a rear side wall, a left side wall, a right side wall, a seat, and a deck. As shown best in FIGS. 1, 2, and 5, the shell 101 includes a front wall having a front outer wall 110 and a front inner wall 111, a rear wall 112, two opposing side walls 113, a floor 114, a seat 115, and a deck 116. The front inner wall 111, the rear wall 112, the two opposing side walls 113, the floor 114, and the seat 115 generally form the bathing area 103. The deck 116 is configured to provide for mounting of a faucet and/or a shower, as discussed below in more detail. The elements (e.g., walls, floor, seat, deck, etc.) of the shell 101 may be integrally formed as a unitary single part or may be formed as several separable parts that are coupled together. The elements of the shell 101 may be made from any suitable material, such as, for example, vitreous, cast (e.g., iron), polymers, composites, or any combination of materials.

Figure 15:
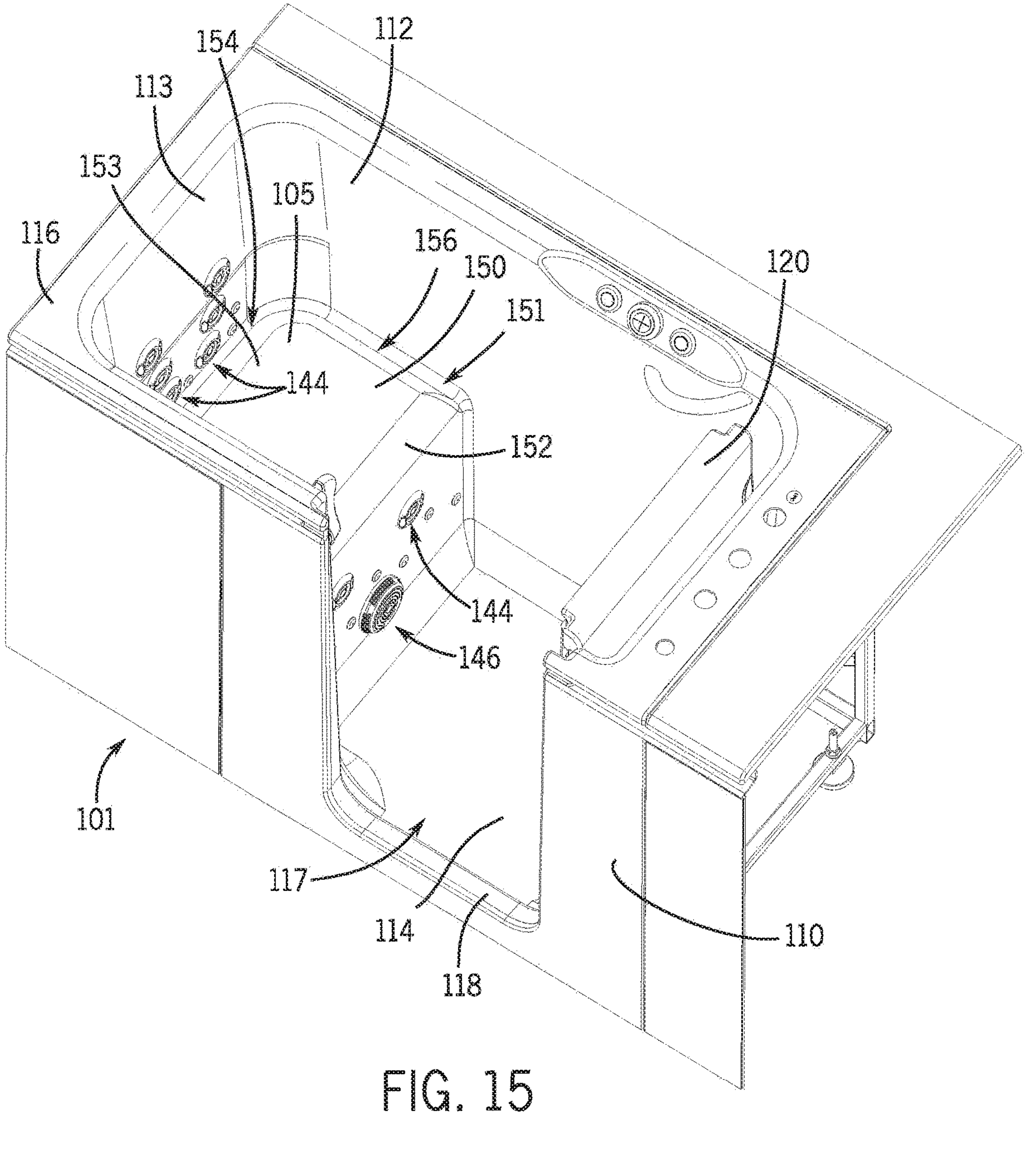
FIG. 15 is another perspective view of the walk in bath shown in FIG. 1, with the door in an open position to allow ingress into and egress from the bath.

As shown in FIG. 15, the shell 101 includes an opening 117 that is configured to receive the door in the closed position. For example, the opening 117 may extend through the front outer wall 110 and the front inner wall 111, such as to receive the door 120 in a closed position. Below the opening 117 in the front wall (e.g., the front outer wall 110, the front inner wall 111) is a step 118 (see FIGS. 3 and 15). Advantageously, the step 118 has a relatively low height to provide easier ingress into and egress from the bathing area 103, which is particularly advantageous for elderly and disabled persons. A height of the step, according to at least one embodiment, is not more than 3 inches. Also, this step may coincide with the floor, that is, the floor may be generally level with the step height. By positioning all of the drainage below the floor of the room that the bath 100 is to be installed in, the floor 114 of the shell 101 may be lowered relative to the floor of the room as well as the step 118. This reduction in height of the step 118 and/or the floor 114 improves access to and from the bathing area 103.

The seat 115 is configured to support a user during bathing in the bath 100. As shown in FIG. 15, the seat 115 is located below the deck 116 and above the floor 114. The seat 115 extends from one of the side walls 113 (e.g., the left side wall, the right side wall). As shown, the seat 115 includes a seating surface 150 and a drainage channel 151. The seating surface 150 supports a user and, according to at least one embodiment, slopes downwardly moving from a front 152 of the seat 115 toward a rear 153 of the seat 115 proximate the associated side wall 113 (e.g., the left side wall, the right side wall). Thus, the seating surface 150 slopes down from front to back (see FIG. 8), such that water on the seat surface drains toward the side wall 113 to which the seat 115 extends from. The seating surface 150 may be flat, curved, convex, a combination thereof, or have any suitable shape that slopes from front to back. A compliant seat may be coupled to the seating surface 150. For example, the seat may be made from a material that is relatively water proof/resilient and compliant (e.g., compressible, deformable, etc.) to provide a cushioned seating surface.

The drainage channel 151 of the seat 115 is configured to carry water from the seat 105 to the floor 114 to improve draining of water from the bath 100. As shown best in FIGS. 8 and 9, the drainage channel extends between the shell 101 and the seating surface 150 to catch water running off of the seating surface 150 and/or the shell 101. According to at least one embodiment, the drainage channel 151 includes a side portion 154 extending between the seating surface 150 and the associated side wall 113 (e.g., the left side wall, right side wall), a front portion 155 extending between the front wall (e.g., the front inner wall 111) and the seating surface 150, and a rear portion 156 extending between the rear wall 112 and the seating surface 150. The drainage channel 151 may be configured to direct water toward the floor 114 (e.g., the drain therein). For example, each portion 154, 155, 156 the drainage channel 151 may be lower than the seating surface 150, such that water flows toward the portions under the influence of gravity. One or more of the portions (e.g., the side portion 154, the front portion 155, the rear portion 156) may be sloped to direct the flow of water under the influence of gravity. For example, the front portion 155 and/or the rear portion 156 may be sloped downwardly moving away from the side portion 154 (e.g., moving from the rear 153 to the front 152 of the seat 115) to channel water away from the seat 115 and toward the floor 114 under the influence of gravity. Also for example, the side portion 154 may be downwardly sloped from a center toward ends, where each end is fluidly connected to one of the front and rear portions 155, 156. Each portion 154, 155, 156 of the drainage channel 151 is configured as a recess (e.g., channel, groove, etc.) and may have any suitable shape (e.g., semi-circular, U-shaped, concave, arcuate, etc.) that carries the water.

The deck 116 may provide an upper surface of the bath 100, such as to support objects for bathing (e.g., towels, soap, bottles, etc.) or other components/elements of the bath 100. For example, the deck 116 may be configured to support a faucet and/or a showerhead. As shown in FIG. 1, the deck 116 includes one or more holes **116*a*** that facilitate coupling of a faucet, a showerhead, and/or controls (e.g., handles) for controlling the faucet and/or the showerhead (discussed below).

The floor 114 is configured to support a user of the bath and includes a drain **114*a* that is configured to be fluidly coupled to a drain pipe to remove water from the bath 100. The drain 114*a* may be located on a side of the bath 100 that is opposite the seat 115 and proximate the door (see FIG. 5). As mentioned above, the drain pipe of this bath may advantageously be located below the floor (e.g., all of the drainage may be below the floor) of the room that the bath 100 is to be installed in, such as to lower the height of the step 118 to improve access to and from the bathing area 103**.

Figure 20:
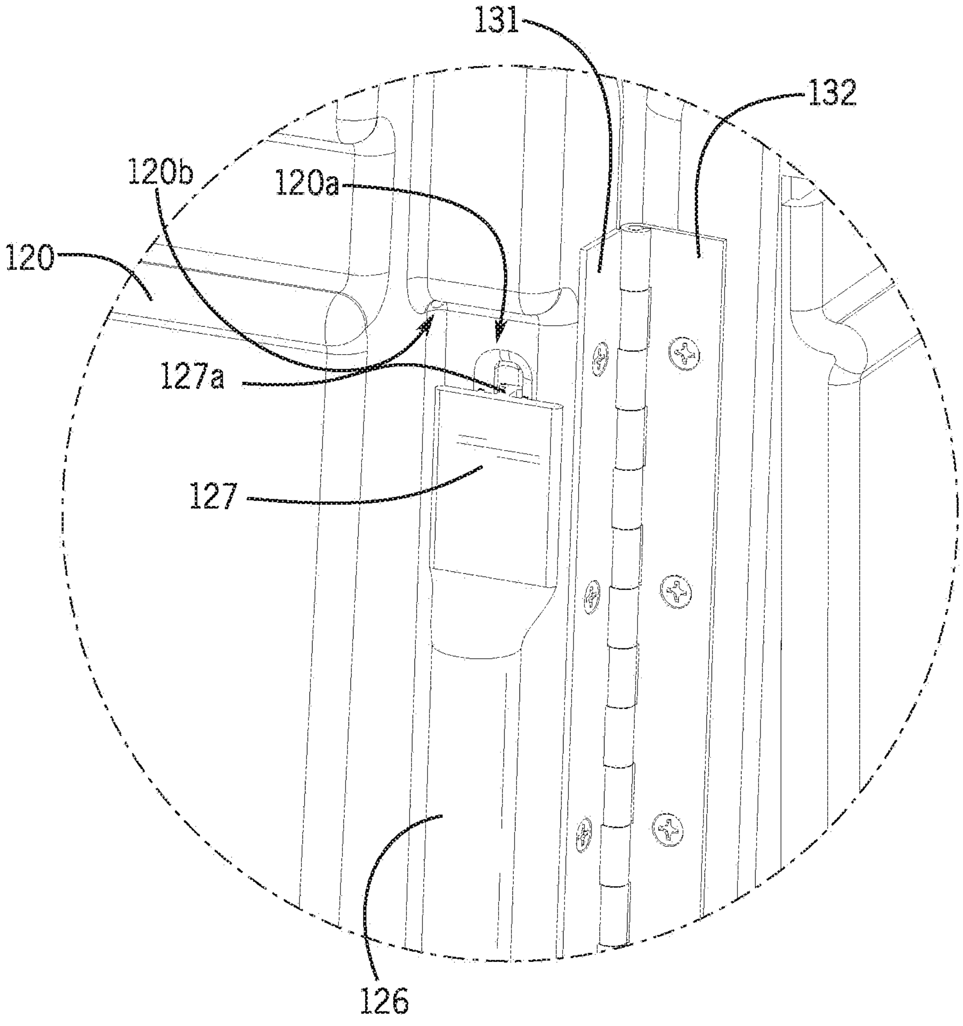
FIG. 20 is a detail view of an end of the sealing member coupled to the door shown in FIG. 16.

The door 120 of the door assembly 102 is moveable relative to the shell 101 (e.g., the front wall) between a closed position (see FIG. 1) and an open position (see FIG. 15). The door 120 engages the opening 117 in the shell 101 in the closed position, as shown in FIGS. 1 and 15. In the open position, the door 120 allows ingress into and egress from the bathing area 103 through the opening 117. The door 120 may be solid or the door 120 may be hollow (e.g., to reduce the weight of the door). As shown best in FIGS. 5 and 14, the door 120 includes a base 121, which is configured (e.g., shaped, sized, etc.) to complement the opening 117 in the shell 101, and a flange 122, which is extends outwardly from the base 121. The flange 122 may extend outwardly from the base 121 along a handle side 123, a hinge side 124, and/or a bottom side 125 (e.g., an underside) of the door 120 (see FIGS. 5 and 17). The flange 122 may be used to secure the door 120 in place in the closed position and/or may advantageously improve the sealing between the door 120 and the shell 101. The flange 122 may be received in a pocket 119 of the shell 101 to provide a secure fit in the closed position. The door 120, such as, for example, when hollow may include a hole (e.g., weep hole, vent hole, etc.) in the door 120. By way of example, a vent hole may located in the door 120, such as above the water fill line, to vent air/gas to aid manufacturing of the hollow door 120. The hole **120*a* used for receiving the finger 127*a* can be a weep/vent hole, or a separate hole 120*b* can be provided to act as a weep/vent hole (see FIG. 20**).

Figure 14:
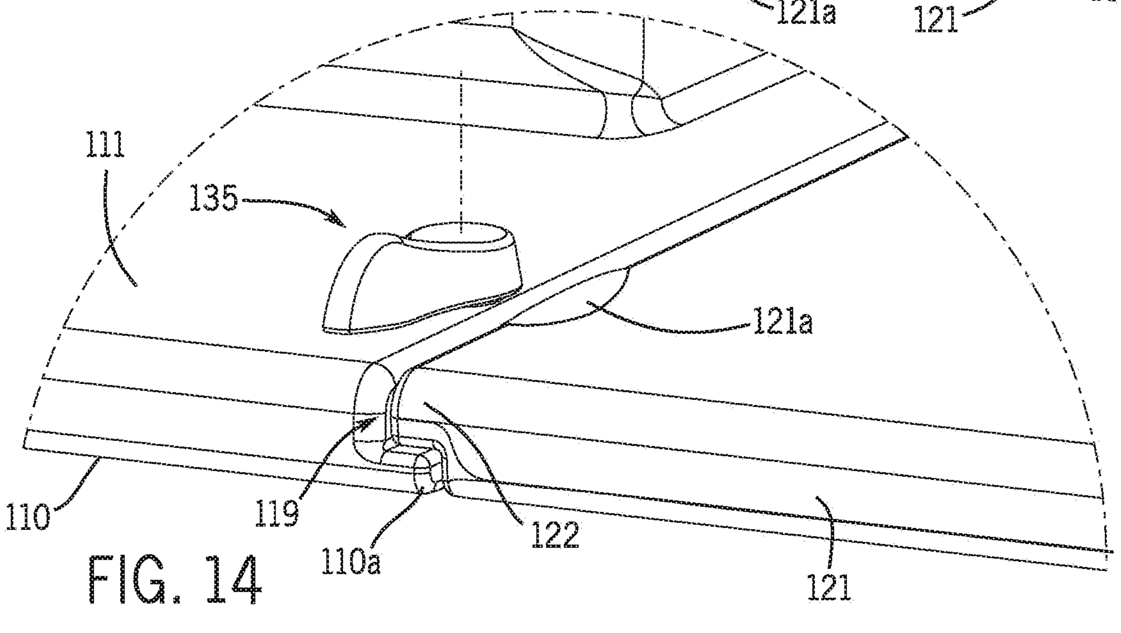
FIG. 14 is another perspective view of the handle and walk in bath shown in FIG. 13, with the handle in an open position.

The flange 122 of the door 120 may be received in a pocket 119 of the shell 101. As shown in FIG. 14, the pocket 119 is shaped as a recess (e.g., channel, cutout, notch, etc.) that extends into the front inner wall 111 behind an edge **110*a* of the front outer wall 110. The pocket 119 receives the flange 122 when the door 120 is closed and the edge 110*a* of the front outer wall 110 acts as a travel stop to the flange 122. An inner surface of the edge 110*a* may be contacted by an outer surface of the flange 122 in the closed position of the door 120. A handle (e.g., the handle 135**) may be used to secure the door in place in the closed position, as discussed below in more detail.

A flexible, impermeable seal (e.g., seal member) may be located between the shell 101 and the door 120 to seal a gap therebetween in the closed position of the door 120 to prohibit water from leaking from the bathing area 103 between the door 120 and the shell 101. As shown best in FIGS. 16 and 17, a seal 126 is coupled to the door 120 and is configured to seal between the door 120 and the shell 101 in the closed position of the door 120. The seal 126 may be configured to extend along the handle side 123, the hinge side 124, and/or the bottom side 125 of the door 120. For example, the seal 126 may be configured to extend in a non-interrupted manner (e.g., continuously, without being separated, etc.) along the handle side 123, the hinge side 124, and the bottom side 125 of the door 120. As shown in FIG. 17, the seal 126 generally has a U-shape or C-shape. The seal 126 may be made from any suitable material that is flexible and generally water resistant/repellant to provide a good seal between the shell and the door.

Figure 18:
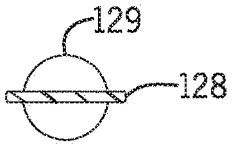
FIG. 18 is a cross-sectional view of the sealing member shown in FIG. 17, with the cutting plane taken along line 18-18 therein.
Figure 19:
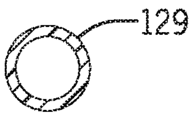
FIG. 19 is another cross-sectional view of the sealing member shown in FIG. 17, with the cutting plane taken along line 19-19 therein.

As shown, the seal 126 comprises a first end 127, a second end 128, and an intermediate section 129 extending between the first and second ends 127, 128. As shown in FIG. 19, the intermediate section 129 is hollow (e.g., having an open center surrounded by a closed wall). Although the intermediate section 129 is shown in FIG. 19 as having an annular shape, the seal 126 is flexible and can be manipulated (e.g., compressed, moved) into other shapes. For example, the intermediate section 129 may be collapsed (e.g., similar to the shape of the ends) when the door 120 is closed due to being compressed between the door 120 and the shell 101. As shown in FIG. 18, each of the first and second ends 127, 128 is closed to prevent water from entering into the hollow intermediate section 129 of the seal 126 through the ends 127, 128. Providing a closed seal 126 (e.g., having closed ends) advantageously prohibits water from getting inside the seal 126. Water inside the seal can lead to cleanliness issues, such as mold or bacteria growth, which is difficult to clean due to the location. Thus, the closed seal 126 advantageously prohibits such internal cleanliness issues.

According to one or more embodiments, the seal 126 is directly coupled to the door 120 so that the seal 126 moves with the door 120 relative to the shell 101 between the open and closed positions. For example, each of the first and second ends 127, 128 of the seal 126 may include a coupling feature, such as a finger 127*a* (e.g., snap, tab, etc.), that engages an opening in the door 120 (shown as the hole 120*a* in FIG. 20) to couple the associated end of the seal 126 directly to the door 120. Each finger may be configured to secure to the door, such as by way of a snap, detent, or other suitable fastener. According to one or more other embodiments, the seal may be directly coupled to the shell 101, such as to a wall of the shell 101. For example, the seal may be coupled directly to an inner facing side of the front outer wall 110 so that the seal is located in the pocket 119 of the shell 101.

Figure 16:
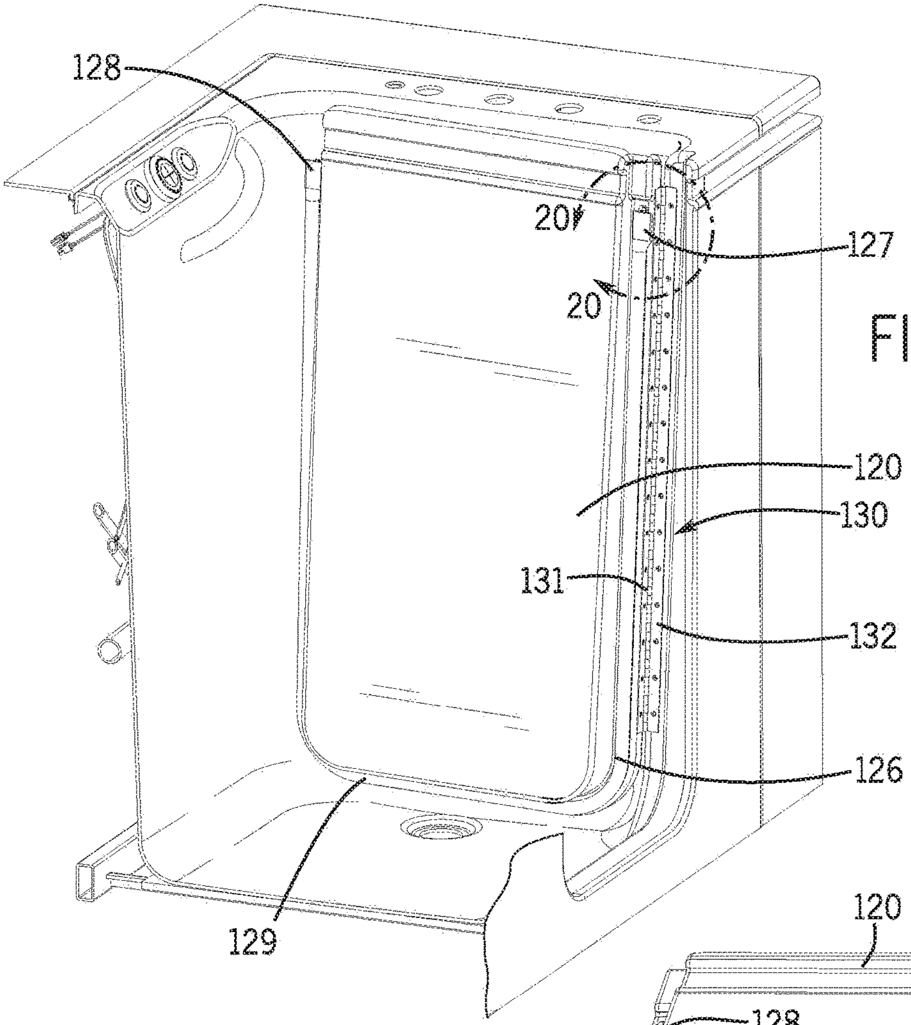
FIG. 16 is a perspective cutaway view of the bath with a door assembly in the open position and having a hinge and a seal member, according to at least one embodiment.
Figure 17:
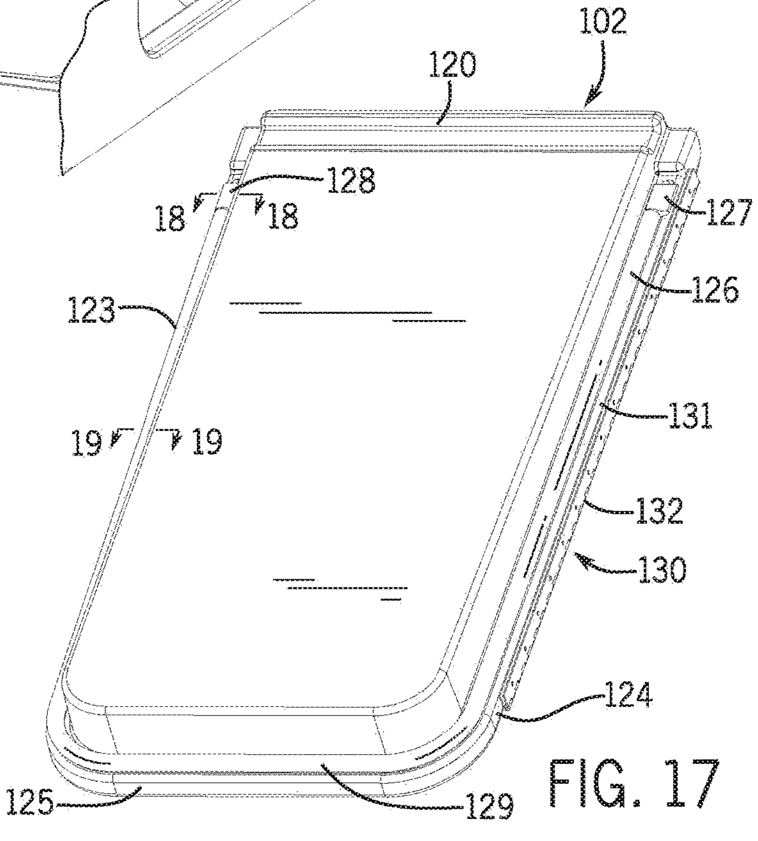
FIG. 17 is a perspective view of the door and sealing member shown in FIG. 16.

As shown in FIGS. 16 and 17, a hinge 130 rotatably couples the door 120 to the shell 101. The hinge 130 may be part of the door assembly 102 and/or the shell 101. For example, a first part 131 of the hinge 130 may be directly coupled to the door 120, while a second part 132 of the hinge 130 may be directly coupled to the shell 101. The first and second parts 131, 132 of the hinge 130 may be rotatable relative to one another about one or more pivots (e.g., pivot pins). As shown, the first part 131 of the hinge 130 is coupled to the hinge side 124 of the door 120 and the second part 132 is coupled to a portion of the front wall of the shell 101 that is located adjacent to the hinge side 124.

Figure 8:
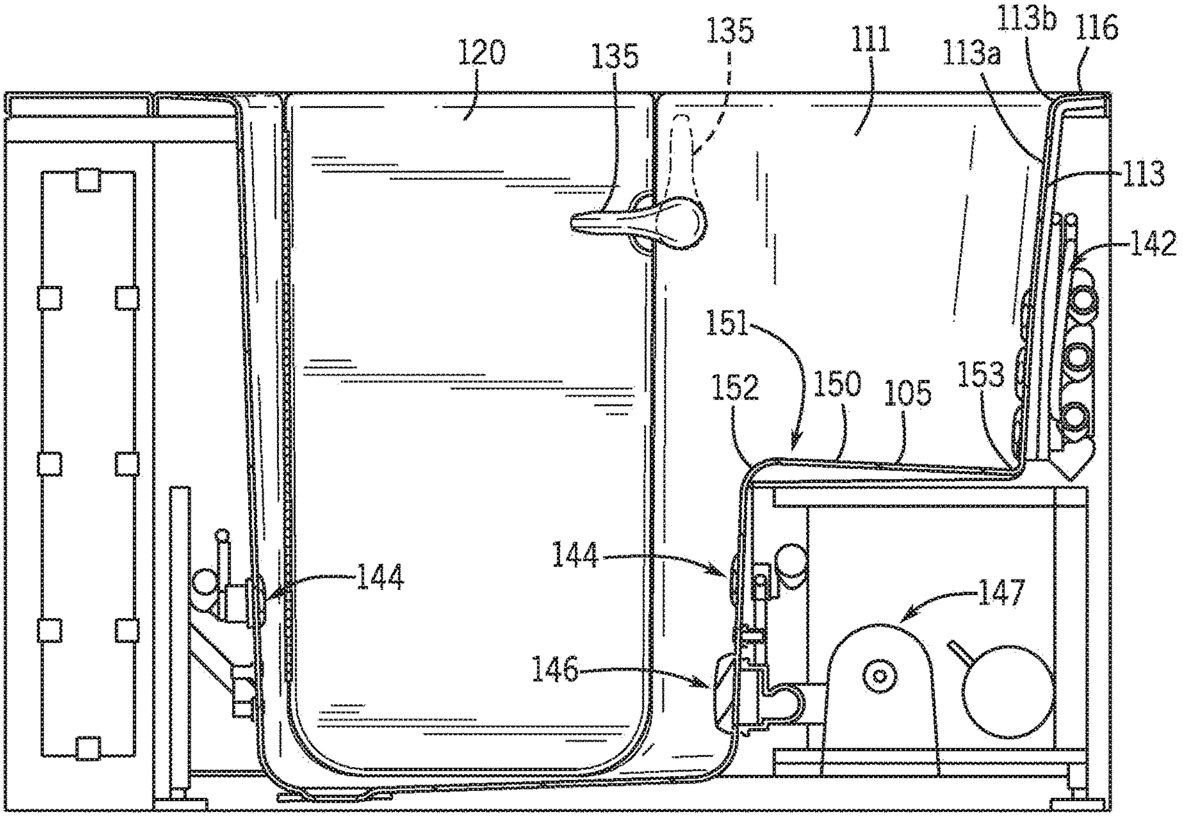
FIG. 8 is cross-sectional view of the walk in bath shown in FIG. 1, with the cutting plane taken along line 8-8 in FIG. 5.
Figure 9:
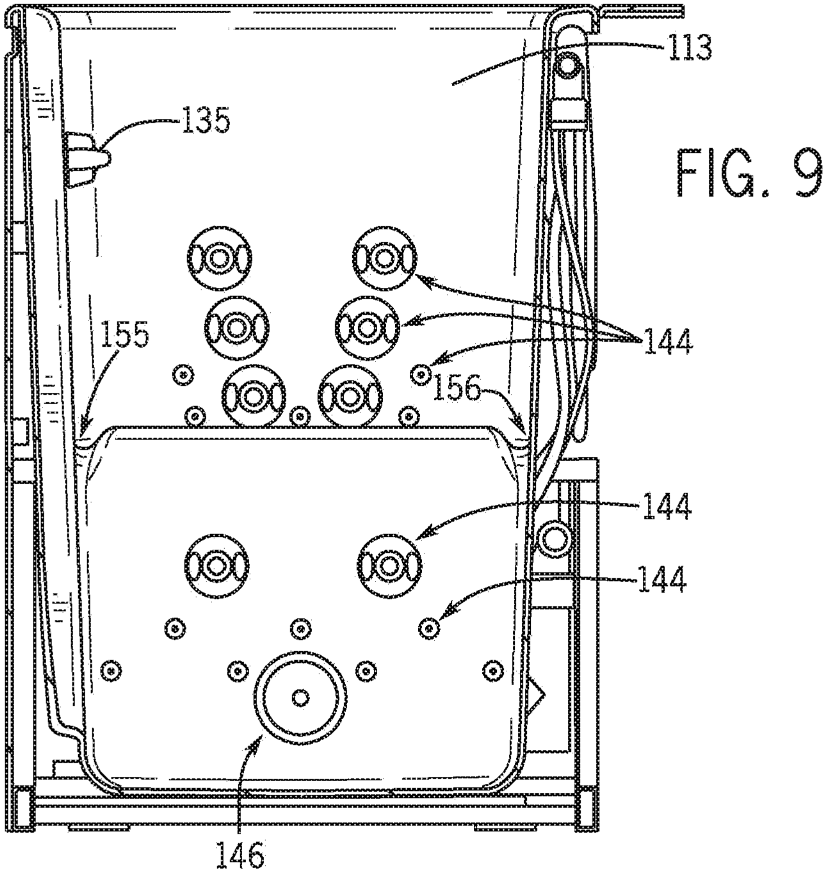
FIG. 9 is another cross-sectional view of the walk in bath shown in FIG. 1, with the cutting plane taken along line 9-9 in FIG. 5.
Figure 10:
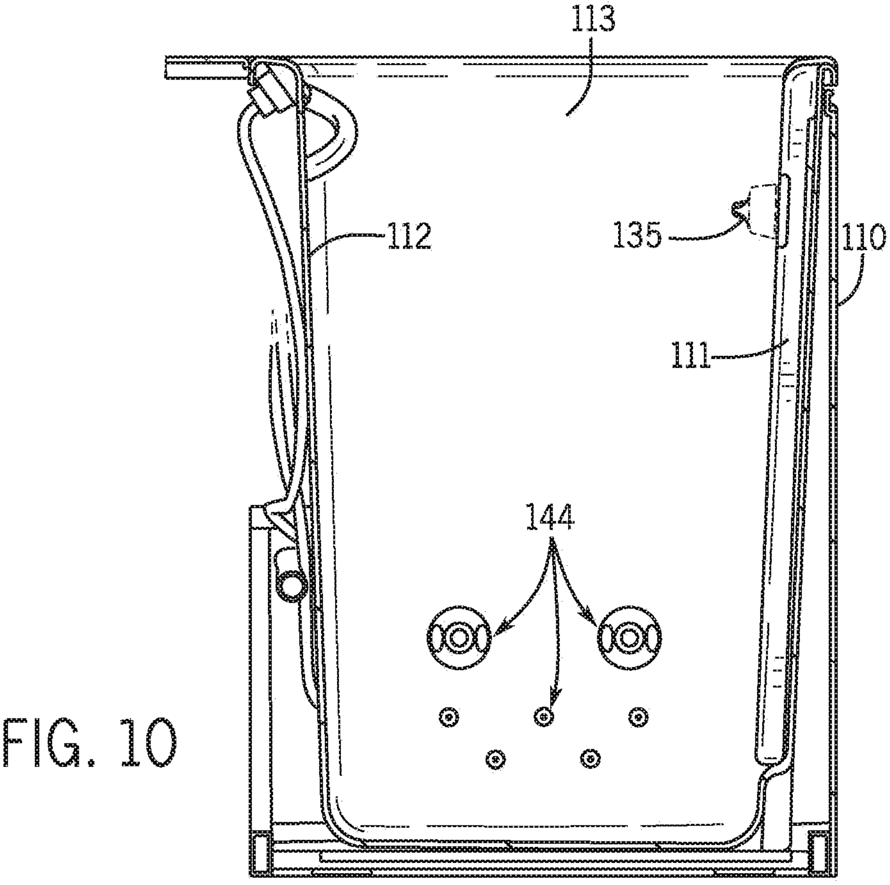
FIG. 10 is another cross-sectional view of the walk in bath shown in FIG. 1, with the cutting plane taken along line 10-10 in FIG. 5.
Figure 13:
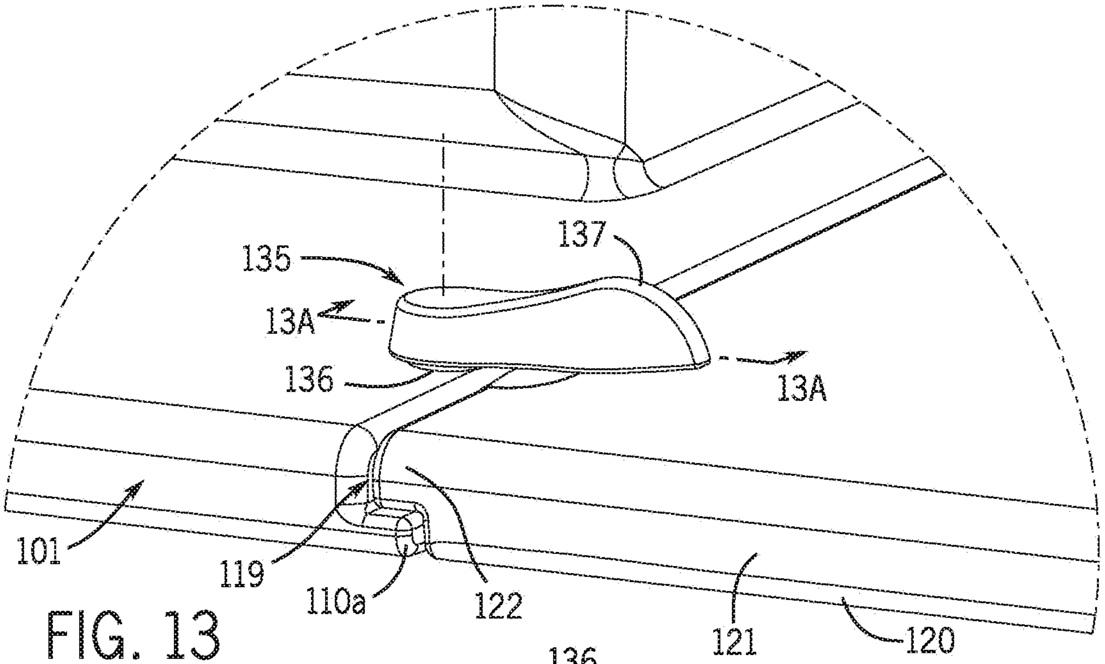
FIG. 13 is a perspective view of a handle for the walk in bath shown in FIG. 1, with the handle in a closed position, according to at least one embodiment.

As shown in FIGS. 13 and 14, the walk in bath 100 includes a handle 135 that is configured to lock the door in the closed position. As shown in FIG. 8, the handle 135 is rotatable between a non-locking position (shown using dashed lines), in which the door 120 is freely rotatable between the open and closed positions, and a locking position (shown using solid lines), in which the door 120 in the closed position is retained in the closed position by the handle 135. The handle 135 is rotatably mounted to the shell 101, such as the front wall thereof, so that the handle 135 is free to rotate relative to the shell 101 between the locking and non-locking positions.

The handle 135 may include a pivot member 136, which defines an axis that the handle 135 rotates about, and an arm 137 extending away from the pivot member 136. The pivot member 136 and the arm 137 may be unitary (e.g., one-piece integrally formed) or may be separate components. If separate, the pivot member 136 can be part of the handle 135 or part of the shell 101. A fastener may be used to couple the arm 137 and the pivot member 136 together and/or to the shell 101. The arm 137 can be grasped/held by a person rotating the handle 135. The pivot member 136 is pivotally coupled to the shell 101 through a mating pivot member, such as a pivot pin 138 that is coupled to the shell 101. For example, the pivot member 136 of the handle 135 may rotate around the pivot pin 138.

Figure 13A:
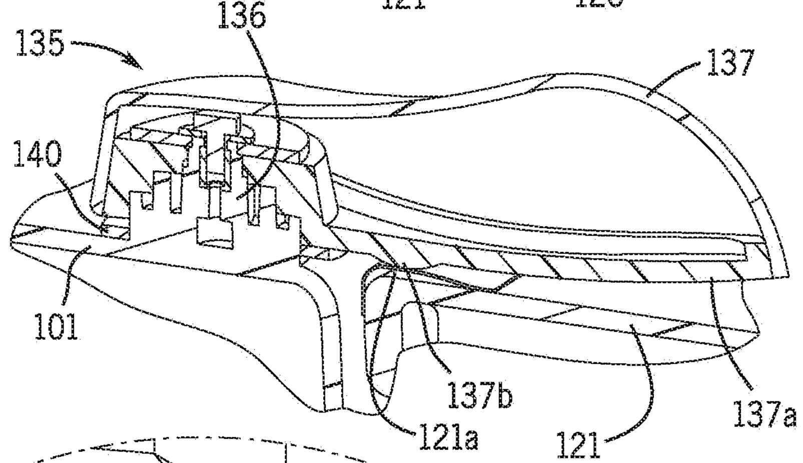
FIG. 13A is a cross-sectional view of a portion of the handle, door, and shell shown in FIG. 13, with the cutting plane taken along line 13A-13A therein.

In the locking position, a portion of the handle 135 engages a portion of the door 120 in the closed position to retain the door 120 in the closed position. As shown in FIGS. 13 and 13A, the arm 137 includes a base surface 137*a* that faces toward the inside of the front wall and the inside of the door 120. The arm 137 may include a projection 137*b* that extends inwardly toward the door 120 from the base surface 137*a* (e.g., the projection 137*b* may extend proud of the base surface 137*a*). The projection 137*b* is offset from the pivot member 136 in a radial direction from the axis of rotation of the handle 135. The projection 137*b* is configured to engage (e.g., contact) a portion of the door 120 in the locking position. According to one or more embodiments, the projection 137*b* has a shape that removes clearances in the system (e.g. between the door 120, the handle 135, and/or the shell 101) upon rotation toward the locking position to provide a water tight fit. For example, the shape of the projection 137*b* may be a ramp, a cam, semi-spherical, or another suitable shape that removes clearances. The projection 137*b* may be relatively rigid, such as for the ramp shape; or the projection 137*b* may be relatively compliant, such as for the semi-spherical shape to provide a locking force (e.g., spring force due to compression) that retains the handle 135 in the locking position.

The projection 137*b* of the handle 135 may be configured to engage a mating projection 121*a* in the base 121 of the door 120 (see, e.g., FIGS. 13A and 14). The projecting 121*a* may extend inwardly from the inside surface of the base 121 of the door 120. In this way, the projection 137*b* of the handle 135 may only contact the projection 121*a* of the door 120 during rotation to prevent the projection 137*b* from rubbing along other parts of door during rotation. The projection 121*a* of the door 120 may be made out of a different material than the door 120, such as to improve the durability of the door and/or reduce markings (e.g., scuffs, scratches, etc.) from having the handle 135 rotate across the projection 121*a*.

According to one or more embodiments, the handle 135 is made from a composite material that includes an external aesthetic material disposed over an inner structural material. By way example, the inner structural material may include a glass filled nylon (e.g., $GFN_3$) and the external aesthetic material may include a polymer (e.g., polypropylene). The external material may be overmolded onto the inner material, such as by a molding process (e.g., injection molding). This handle arrangement advantageously provides an improved strength that is capable of withstanding 250 lbs. or more of force applied directly to the handle 135.

The walk in bath 100 may include a wave washer 140 located between the handle 135 and the shell 101 to help remove clearance therebetween. According to one or more embodiments, the wave washer 140 is disposed between the pivot member 136 and the shell 101 to bias the handle 135 away from the shell 101. According to one or more other embodiments, the wave washer 140 surrounds the pivot member 136 and biases the handle 135 away from the shell 101. The wave washer can impart the biasing force directly into the pivot member 136 or the arm 137.

The bath 100 may include a heater (e.g., heating element) for heating a portion of the shell 101 independently of the water in the bath. As shown in FIG. 8, the bath 100 includes an electric heater 142 that heats a back portion 113*a* and a neck portion 113*b* of the side wall 113, which are located above the seat 105. The heater 142 may be located adjacent the back portion 113*a*, as shown, to directly heat the back portion 113*a* and/or the neck portion 113*b*. As noted, the heater 142 heats the portions of the shell independently of the water in the bath. The heater 142 may be configured to convert electric power from an electric power source into heat for heating the portions of the bath 100. A controller may be provided to control the heater 142, such as, for example, by allowing a user of the bath to adjust (e.g., increase, decrease) a temperature setting for the heater 142 and to turn on/off the heater 142. The heater 142 advantageously may heat the various locations before, during, and after each bath.

The heater 142 may be configured to heat the seat 105 as well. For example, the heater 142 may heat the seating surface 150 of the seat 105. The controller may allow for adjustment of the heating of the seat 105, the back portion 113*a* and the neck portion 113*b* independently of one another or together (e.g., dependently as a single system).

The bath 100 may include one or more jets 144 that are configured to spray (e.g., discharge) water into the bathing area 103. For example, one or more jets 144 may be located in the back portion 113*a* of the side wall 113 to massage a user's back when seated on the seat 105 of the bath 100. Also for example, one or more jets 144 may be located in the wall beneath the seat 105 to massage a user's legs when seated on the seat 105. The jets 144 are advantageously positioned to provide hydrotherapy along certain stress points along the legs (e.g., thighs, feet, etc.) and back. Also for example, one or more jets 144 may be located on the side wall 133 opposite the seat 105, the front wall, and/or the rear wall 112 in order to direct spray toward the user in the bath 100. One or more pumps or other suitable devices may be used to generate the water pressure for spraying water from the pumps. The jets 144 and one or more pumps for the jets 144 may be controlled by the controller.

The bath 100 may include a recirculation system for recirculating the water in the bath. For example, the recirculation system may include a water intake/outlet 146 and one or more than one pump 147. Water can be taken in and/or directed out of each intake/outlet 146 by fluid pressure created by each pump 147. A filtering system may optionally be employed to filter the water, which may operate in concert with the pump 147.

The bath 100 may include a faucet, a shower, and/or other suitable water discharging device. For example, a bath tap (e.g., faucet) may be mounted to the deck 116 via one or more of the mounting holes 116*a* therein. Also for example, a shower (e.g., a hand held sprayer) may be mounted to the deck 116 via one or more of the mounting holes 116*a* therein. The faucet, the shower, and/or other suitable water discharging devices may be controlled by local controllers associated with the faucet, shower, or other device, and/or may be controlled by a central controller that controls other operations of the bath 100 (e.g., the jets, heater, etc.).

Figure 12:
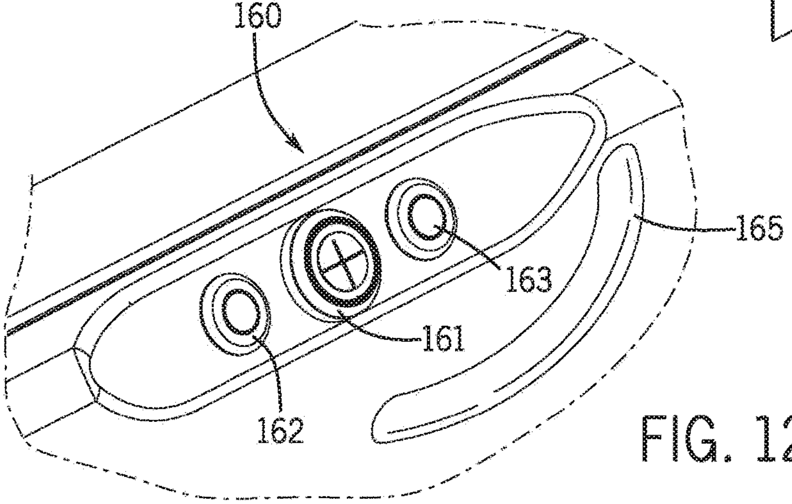
FIG. 12 is a detail view of a portion of the walk in bath shown in FIG. 11.

The bath 100 includes a controller for controlling one or more of the functions (e.g., operations) of the bath features. As shown in FIG. 1, the controller 160 is located in a recessed area adjacent to the deck 116 and the rear wall 112. The controller 160 is configured to control the operation of the one or more jets 144, the heater 142, and/or other elements/components of the bath 100. As shown in FIG. 12, the controller 160 includes a central touchpad 161, a left side button 162 and a right side button 163. Each of the left and right side buttons 162, 163 are configured to control some of the jets 144. For example, the left side button 162 may control (e.g., turn on/off, velocity of discharge, etc.) the jets 144 located in the left side of the bath 100, while the right side button 163 may control the jets 144 located on the right side of the bath 100. The central touchpad 161 may be configured to control the heater 142, such as location of heating (e.g., back, neck, etc.) and temperature setting.

Figure 3:
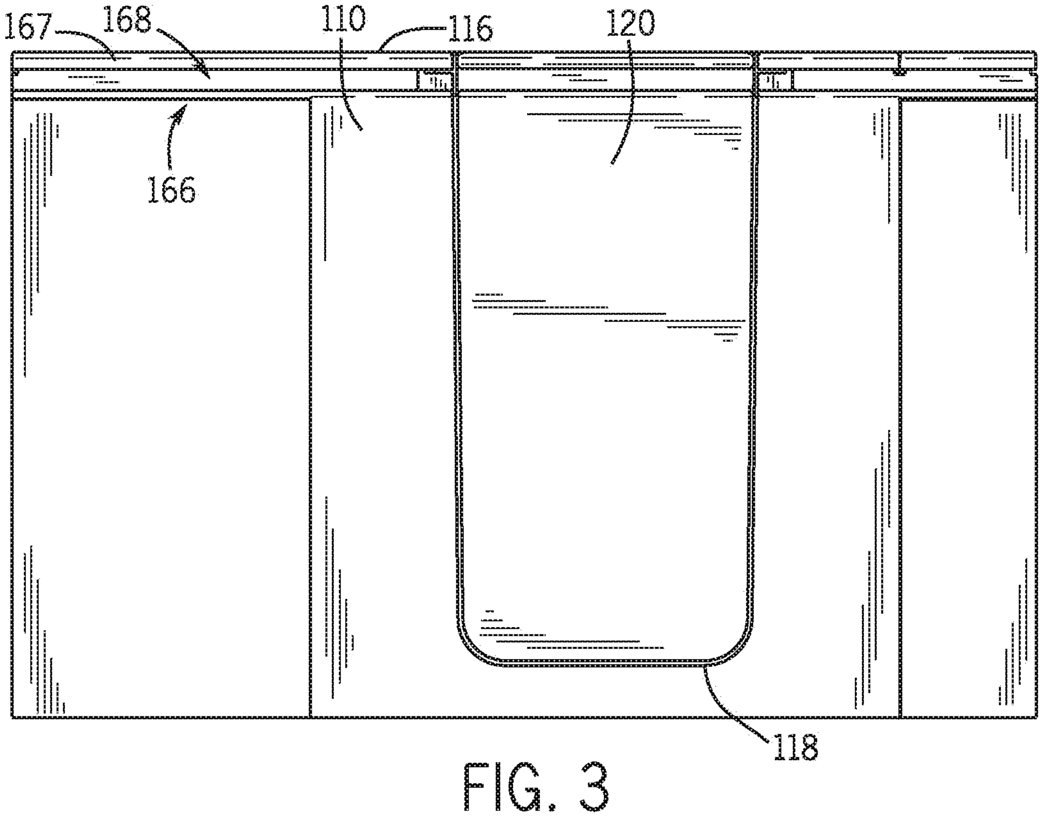
FIG. 3 is a front view of the walk in bath shown in FIG. 1.
Figure 4:
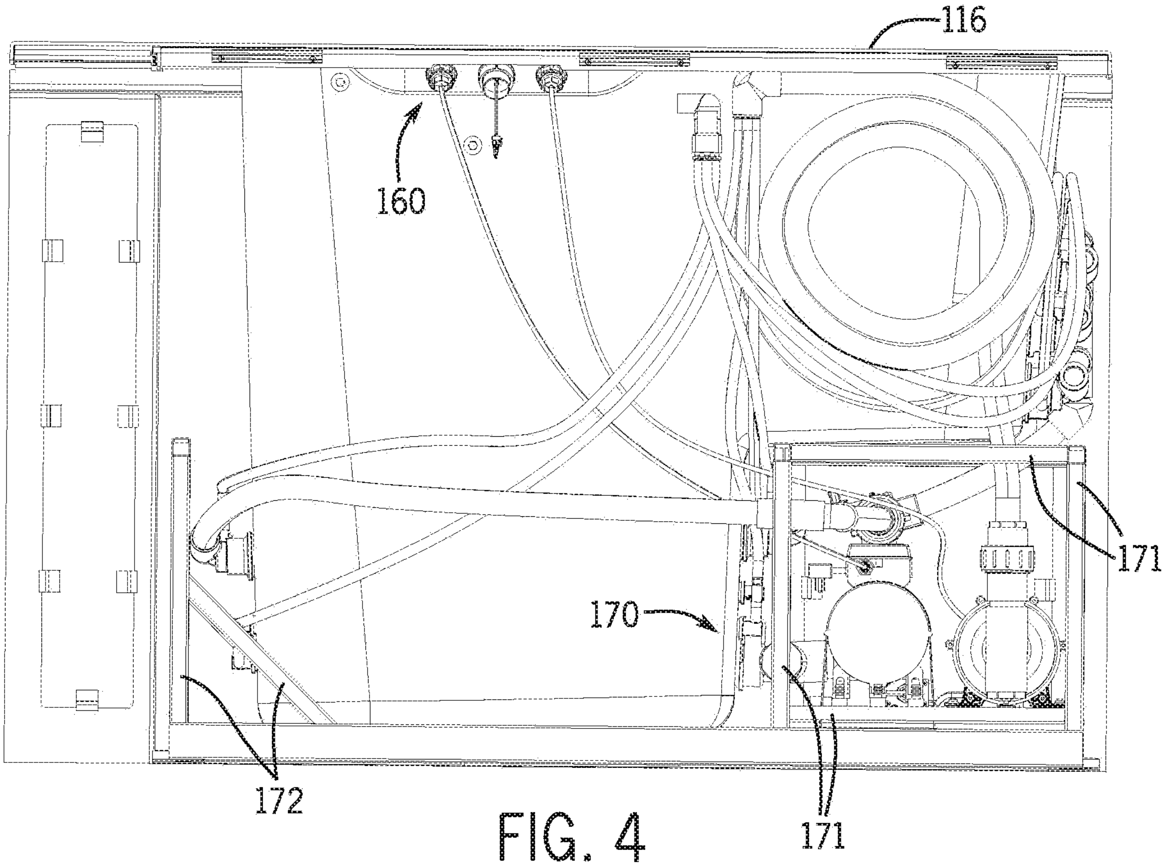
FIG. 4 is a rear view of the walk in bath shown in FIG. 1.
Figure 5:
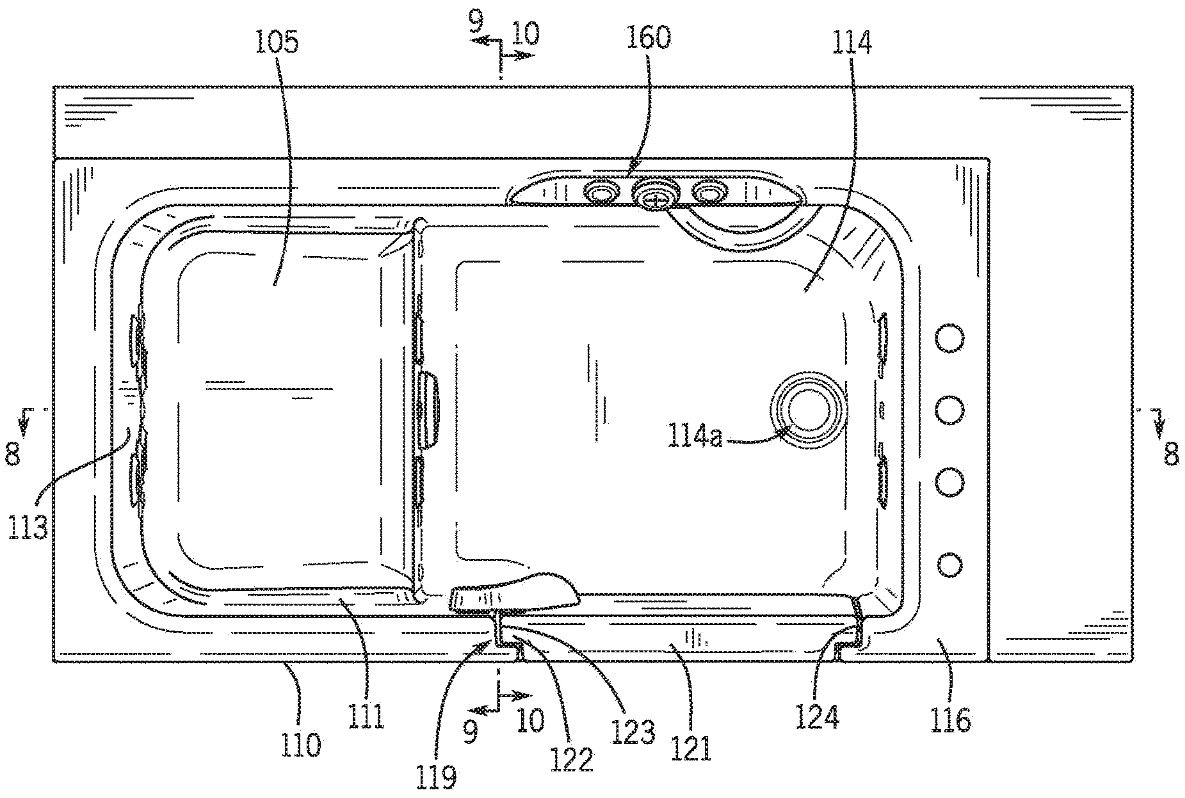
FIG. 5 is a top view of the walk in bath shown in FIG. 1.
Figure 6:
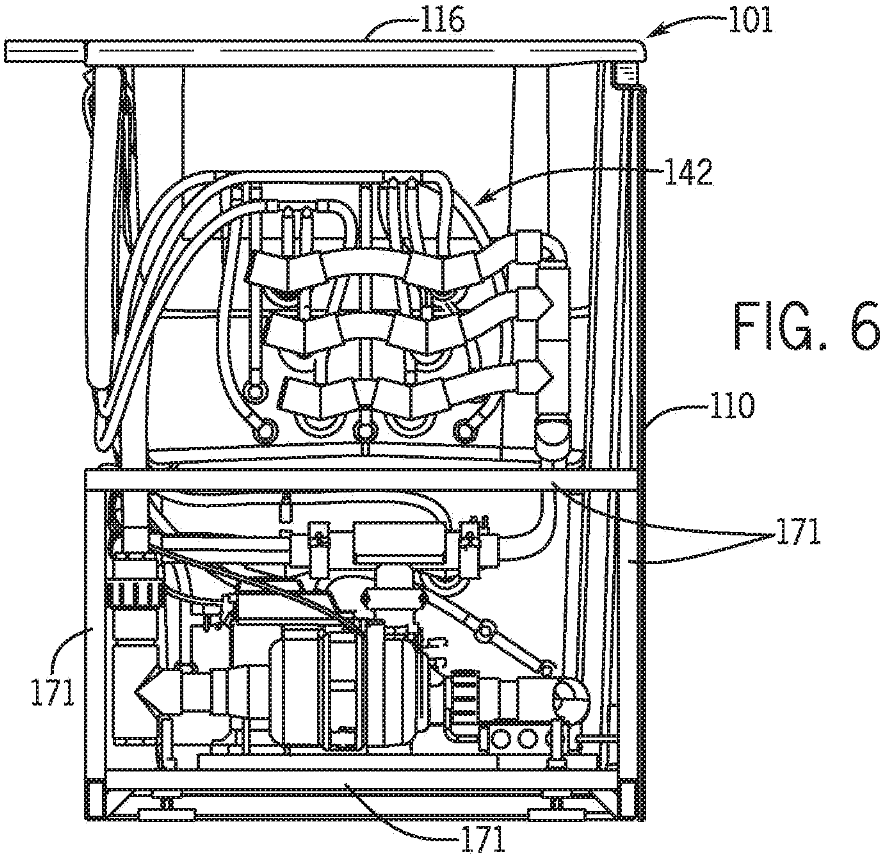
FIG. 6 is a side view of the walk in bath shown in FIG. 1.
Figure 7:
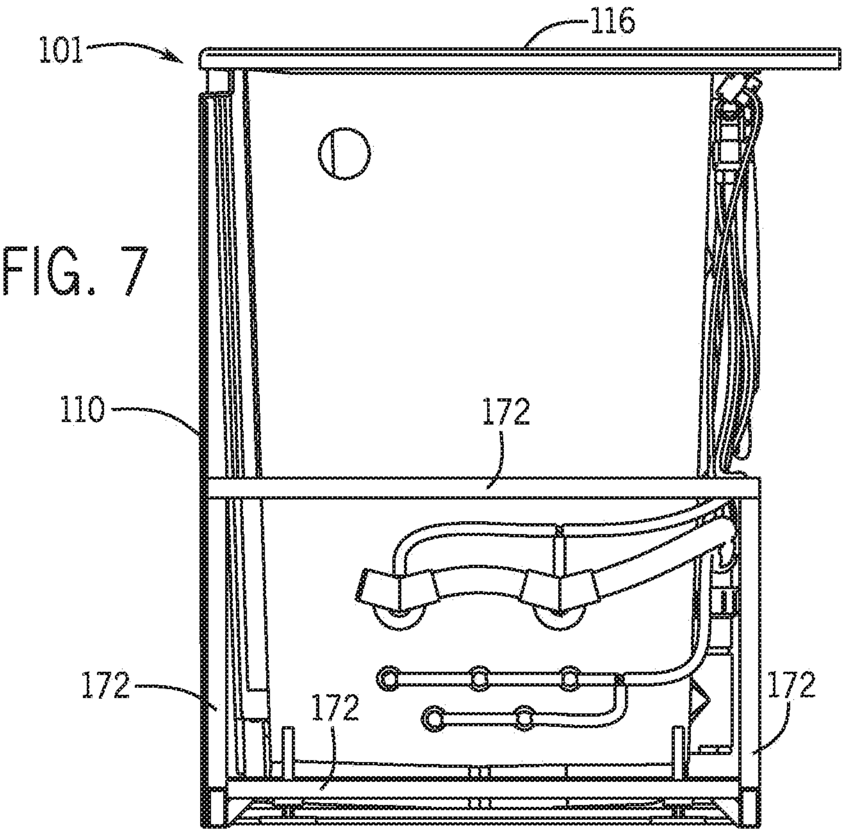
FIG. 7 is another side view of the walk in bath shown in FIG. 1.

The bath 100 may include additional handles that are separate from the handle 135 for the door 120. As shown in FIG. 12, a hand bar 165 is provided to support a user during ingress into, egress from, and moving within the bath 100. The hand bar 165 is configured to extend into the bathing area 103 from the inner side of the rear wall 112 of the shell 101 at a location that is approximately opposite the door 120. As shown, the hand bar 165 has an arcuate shape with two ends coupled to the rear wall 112. As shown in FIGS. 1 and 3, a hand rail 166 is integrated into a front facing side of the front outer wall 110, and the hand rail 166 includes a lip 167 and a channel 168 located beneath the lip 167. The channel 168 is sized to receive a person's hand, such as their fingers as the person's palm is supported by the lip 167 and/or the deck 116. The deck 116 and an upper portion of the front side wall may define the lip 167 and/or the channel 168 extending into the front side wall from the front facing surface toward a rear facing surface. According to one or more embodiments, the hand bar 165 and the hand rail 166 are spaced apart by a user distance, which advantageously allows the user to grasp both the hand bar 165 and the hand rail 166 at the same time improving ingress/egress. According to one example, the user distance is less than about 4' (four feet), which accommodates the vast majority of people. According to another example, the user distance is less than about 3' (three feet). The hand bar 165 can also be located a distance from the user in the seated position that advantageously allows the user to grasp the hand bar 165 when seated. According to another example, the distance from the hand bar 165 to a seated user can be less than about 27" (twenty seven inches) and the distance from the hand bar 165 to a user outside the door 120 of the bath 100 can be than about 22" (twenty two inches). Depending on the sitting position of the user, the distance from the seated user to the hand bar 165 can be less than about 2' (two feet). The hand bar 165 may be located adjacent to a handle side 123 of the door 120 in the open position; and a portion of the channel 168 of the hand rail 166 may be located adjacent to the door 120 in the closed position.

The bath 100 may include a frame 170 for support other elements (e.g., the shell 101, electronics, pumps, etc.) of the bath 100. The frame 170 includes a plurality of members. As shown best in FIGS. 8 and 11, a first set of members 171 are provided for supporting the seat 105, the heater 142 (if provided), the pump 147, as well as some of the plumbing components for water distribution. As shown best in FIGS. 2 and 4, a second set of members 172 are provided for supporting the bath 100 at the side wall 113 opposite the seat 105. Cross members 173 may be configured to interconnect the first and second sets of members 171, 172. Additional members may be provided to support the bath 100.

Figure 11:
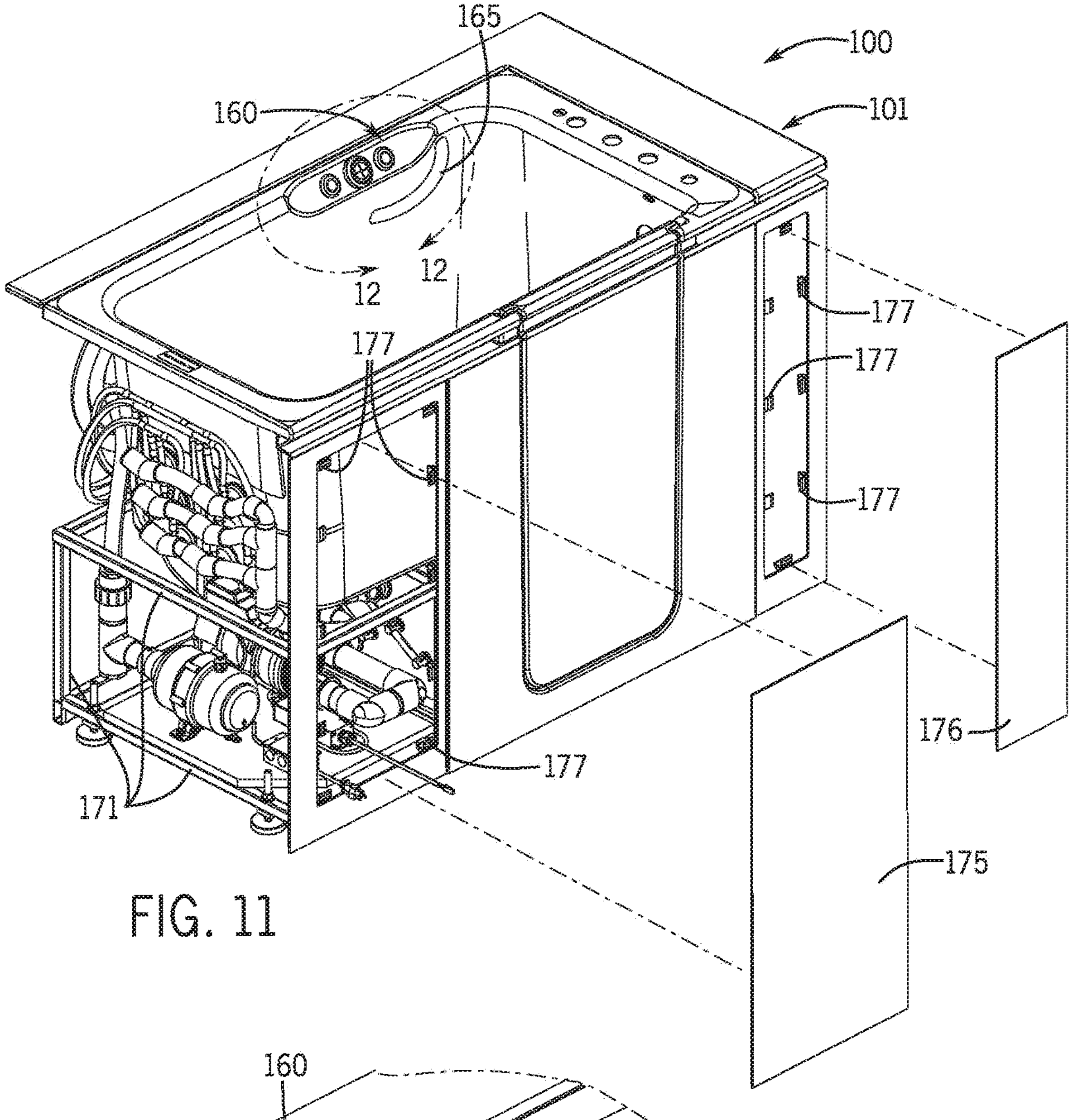
FIG. 11 is another perspective view of the walk in bath shown in FIG. 1, with removable access panels shown removed for clarity.

The shell 101 may include one or more access panels that are selectively removable (e.g., detachable) to gain access to one or more spaces housing elements/components of the bath 100. As shown in FIG. 11, the shell 101 includes a left access panel 175, which is removable from a left side of the front wall to gain access to the components of the bath 100 adjacent to (e.g., underneath) the seat 105, and a right access panel 176, which is removable from a right side of the front wall to gain access to the components of the bath 100 adjacent to the side wall 113 opposite the seat 105 side.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the walk in baths, as shown in the exemplary embodiments, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., shell, door, handle, heater, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A walk in bath comprising:
a shell defining a bathing area, the shell comprising a floor, a front side wall having an opening therein, a rear side wall, a left side wall, a right side wall, a seat, and a deck at the top of each side wall, wherein the seat is below the deck and above the floor and the seat extends from one of the left side or right side walls, wherein the seat comprises:
a seating surface that supports a user and slopes downwardly moving from a front of the seat toward a rear of the seat proximate the associated side wall from which the seat extends; and
a drainage channel having a side portion extending between and below the seating surface and the associated side wall thereby separating the seating surface from the associated side wall, a front portion extending between and below the front side wall and the seating surface thereby separating the front side wall from the seating surface, and a rear portion extending between and below the rear side wall and the seating surface thereby separating the rear side wall from the seating surface, wherein the drainage channel is lower than the seating surface to channel water; and
a door that is moveable relative to the shell between a closed position, in which the door engages the opening in the front side wall, and an open position allowing ingress into and egress from the bathing area through the opening.

2. The walk in bath of claim 1, wherein each of the front and rear portions of the drainage channel slope downwardly moving away from the side portion of the drainage channel.

3. The walk in bath of claim 2, wherein the side portion of the drainage channel slopes downwardly moving away from one of the front and rear portions of the drainage channel.

4. The walk in bath of claim 2, wherein:
the side portion of the drainage channel comprises a central portion disposed between the front portion of the drainage channel and the rear portion of the drainage channel;

the side portion of the drainage channel slopes downwardly from the central portion moving towards the front portion of the drainage channel; and the side portion of the drainage channel slopes downwardly from the central portion moving towards the rear portion of the drainage channel.

5. The walk in bath of claim 1, further comprising a heating element that selectively heats the side wall from which the seat extends independently of water in the bath.

6. The walk in bath of claim 5, wherein the heating element also heats a head and neck portion of the deck that is adjacent to the side wall from which the seat extends.

7. The walk in bath of claim 1, wherein the door comprises:

a hinge side disposed along a first plane for a first length; and a handle side disposed along a second plane for the first length, the second plane being parallel to the first plane.

8. The walk in bath of claim 1, further comprising a seal member located between the front side wall and the door when the door is in the closed position, the seal member comprising:

a first end;

a second end;

an intermediate hollow section extending between the first end and the second end, the intermediate hollow section closed by the first end and closed by the second end; and a finger extending from at least one of the first end or the second end;

wherein the door comprises a door opening; and wherein the finger is configured to be received within the door opening to couple the seal member to the door.

9. A walk in bath comprising:

a shell defining a bathing area, the shell comprising:

a front side wall;

a first side wall; and a seat extending from the first side wall, the seat comprising:

a seating surface that is configured to support a user; and a drainage channel extending at least partially around the seating surface, the drainage channel being recessed relative to the seating surface and configured to direct fluid away from the seating surface; and a door rotatably coupled to the front side wall and operable between an open position and a closed position.

10. The walk in bath of claim 9, wherein the seating surface slopes downwardly from a front edge of the seat towards a rear edge of the seat opposite the front edge and contiguous with the first side wall.

11. The walk in bath of claim 9, further comprising a rear side wall;

wherein the drainage channel comprises:

a front portion disposed between the seating surface and the front side wall, the front portion sloping downwardly moving away from the first side wall; and a rear portion disposed between the seating surface and the rear side wall, the rear portion sloping downwardly moving away from the first side wall.

12. The walk in bath of claim 11, wherein the drainage channel further comprises a side portion contiguous with at least one of the front portion or the rear portion, the side portion sloping downwardly moving away from at least one of the front side wall or the rear side wall.

13. The walk in bath of claim 9, further comprising a heating element that is configured to selectively heat the first side wall.

14. The walk in bath of claim 13, further comprising:

a second side wall;

a rear side wall; and a deck contiguous with the front side wall, the rear side wall, the first side wall, and the second side wall;

wherein the heating element is further configured to selectively heat the deck proximate the first side wall.

15. The walk in bath of claim 9, further comprising:

a seal member located between the front side wall and the door when the door is in the closed position, the seal member comprising:

a first end;

a second end;

an intermediate hollow section extending between the first end and the second end, the intermediate hollow section closed by the first end and closed by the second end; and a finger extending from at least one of the first end or the second end;

wherein the door comprises a door opening; and wherein the finger is configured to be received within the door opening to couple the seal member to the door.

16. A walk in bath comprising:

a shell comprising:

a front side wall; and a first side wall;

a seat extending from the first side wall, the seat comprising:

a seating surface; and a drainage channel extending at least partially along the seating surface, the drainage channel being recessed relative to the seating surface;

a door rotatably coupled to the front side wall and operable between an open position and a closed position, the door comprising a door opening; and a seal member located between the front side wall and the door when the door is in the closed position, the seal member comprising:

a first end;

a second end;

an intermediate hollow section extending between the first end and the second end; and a finger extending from at least one of the first end or the second end, the finger configured to be received within the door opening to couple the seal member to the door.

17. The walk in bath of claim 16, wherein the seating surface slopes downwardly from a front edge of the seat towards a rear edge of the seat opposite the front edge and contiguous with the first side wall.

18. The walk in bath of claim 16, further comprising a rear side wall;

wherein the drainage channel comprises:

a front portion disposed between the seating surface and the front side wall, the front portion sloping downwardly moving away from the first side wall; and a rear portion disposed between the seating surface and the rear side wall, the rear portion sloping downwardly moving away from the first side wall.

19. The walk in bath of claim 18, wherein the drainage channel further comprises a side portion contiguous with at least one of the front portion or the rear portion, the side portion sloping downwardly moving away from at least one of the front side wall or the rear side wall.

20. The walk in bath of claim 16, further comprising a heating element that is configured to selectively heat the first side wall proximate the seat.

21. The walk in bath of claim 1, further comprising a hinge coupled to the shell and the door, the hinge configured to facilitate rotation of the door relative to the shell.

* * * * *